(12) United States Patent
Ahn et al.

(10) Patent No.: US 11,305,890 B2
(45) Date of Patent: Apr. 19, 2022

(54) STIFFENER COMPOSITE CHARGE APPLICATION SYSTEM

(71) Applicant: The Boeing Company, Chicago, IL (US)

(72) Inventors: Jonathan Young Ahn, Tukwila, WA (US); Davis Tran, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 372 days.

(21) Appl. No.: 16/400,982

(22) Filed: May 1, 2019

(65) Prior Publication Data

US 2020/0346785 A1 Nov. 5, 2020

(51) Int. Cl.
*B64F 5/10* (2017.01)
*B29C 70/54* (2006.01)
*B29L 31/30* (2006.01)

(52) U.S. Cl.
CPC .............. *B64F 5/10* (2017.01); *B29C 70/541* (2013.01); *B29L 2031/3082* (2013.01)

(58) Field of Classification Search
CPC ......... B64F 5/10; B29C 70/541; B29C 70/38; B29L 2031/3082; B29L 2031/3085; B25J 9/00
See application file for complete search history.

(56) References Cited

U.S. PATENT DOCUMENTS

| | | | |
|---|---|---|---|
| 9,873,500 B2 | 1/2018 | Wilcoxson et al. | |
| 2009/0193642 A1* | 8/2009 | Lin | B25J 15/0061 29/428 |
| 2015/0314889 A1* | 11/2015 | Day | B23P 21/004 408/1 R |
| 2016/0075092 A1 | 3/2016 | Wilcoxson et al. | |
| 2020/0290108 A1* | 9/2020 | Casanelles Moix | B25J 9/0087 |

FOREIGN PATENT DOCUMENTS

| | | |
|---|---|---|
| EP | 0480652 A1 | 4/1992 |
| EP | 1044790 A1 | 10/2000 |
| EP | 2998228 A1 | 3/2016 |
| EP | 3067187 A1 | 9/2016 |

OTHER PUBLICATIONS

Definition of "a number of" from merriam-webster.com (Year: 2021).*
Extended European Search Report dated Sep. 14, 2020 regarding EP Application No. 20166387.9; 11 pgs.

* cited by examiner

*Primary Examiner* — Cynthia L Schaller
(74) *Attorney, Agent, or Firm* — Yee & Associates, P.C.

(57) ABSTRACT

A stiffener composite charge placement system is presented. The stiffener composite charge placement system comprises a longitudinal end effector having a first attachment point and a second attachment point; a first rotational arm having a first connector configured to connect to the first attachment point; a first movement system configured to move the first rotational arm within a manufacturing environment; a second rotational arm having a second connector configured to connect to the second attachment point; and a second movement system configured to move the second rotational arm within the manufacturing environment.

24 Claims, 16 Drawing Sheets

STIFFENER COMPOSITE CHARGE APPLICATION SYSTEM

BACKGROUND INFORMATION

1. Field

The present disclosure relates generally to composite manufacturing and more specifically to positioning longitudinal composite charges on a layup mandrel. Yet more specifically, the present disclosure relates to positioning uncured longitudinal composite charges for forming stiffened composite structures.

2. Background

A stiffened composite structure has a plurality of composite stiffeners joined or bonded to a composite skin. The composite stiffeners may be joined or bonded to the composite skin prior to or following the curing of the composite skin.

In some processes, uncured composite stiffeners are positioned onto a layup mandrel prior to laying up a plurality of composite plies over the layup mandrel. Components of a composite stiffener may be laid up sequentially layer by layer directly onto the layup mandrel.

Laying up a composite charge of a composite stiffener onto the layup mandrel manually takes at least one of an undesirable amount of time or an undesirable amount of operator labor. Maintaining a configuration of a composite charge during manual handling and placement may be undesirably difficult. Additionally, providing accurate and consistent placement of the composite charges on the layup mandrel affects the quality of the composite structure. Therefore, it would be desirable to have a method and apparatus that takes into account at least some of the issues discussed above, as well as other possible issues.

SUMMARY

An illustrative embodiment of the present disclosure provides a stiffener composite charge placement system. The stiffener composite charge placement system comprises a longitudinal end effector having a first attachment point and a second attachment point; a first rotational arm having a first connector configured to connect to the first attachment point; a first movement system configured to move the first rotational arm within a manufacturing environment; a second rotational arm having a second connector configured to connect to the second attachment point; and a second movement system configured to move the second rotational arm within the manufacturing environment.

Another illustrative embodiment of the present disclosure provides a stiffener composite charge placement system comprising: a first rotational system comprising a first rotational arm mounted on a first movement system configured to relocate the first rotational arm within a manufacturing environment; a second rotational system comprising a second rotational arm mounted on a second movement system configured to relocate the second rotational arm within a manufacturing environment; and a longitudinal end effector configured to be connected to the first rotational arm and the second rotational arm.

Yet another illustrative embodiment of the present disclosure provides a method of applying a stiffener composite charge to a cavity of a mandrel. A longitudinal end effector holding the stiffener composite charge is moved relative to the mandrel by rotating a first rotational arm and a second rotational arm while the first rotational arm and the second rotational arm are connected to the longitudinal end effector. The stiffener composite charge is placed into the cavity of the mandrel by retracting the first rotational arm and the second rotational arm.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
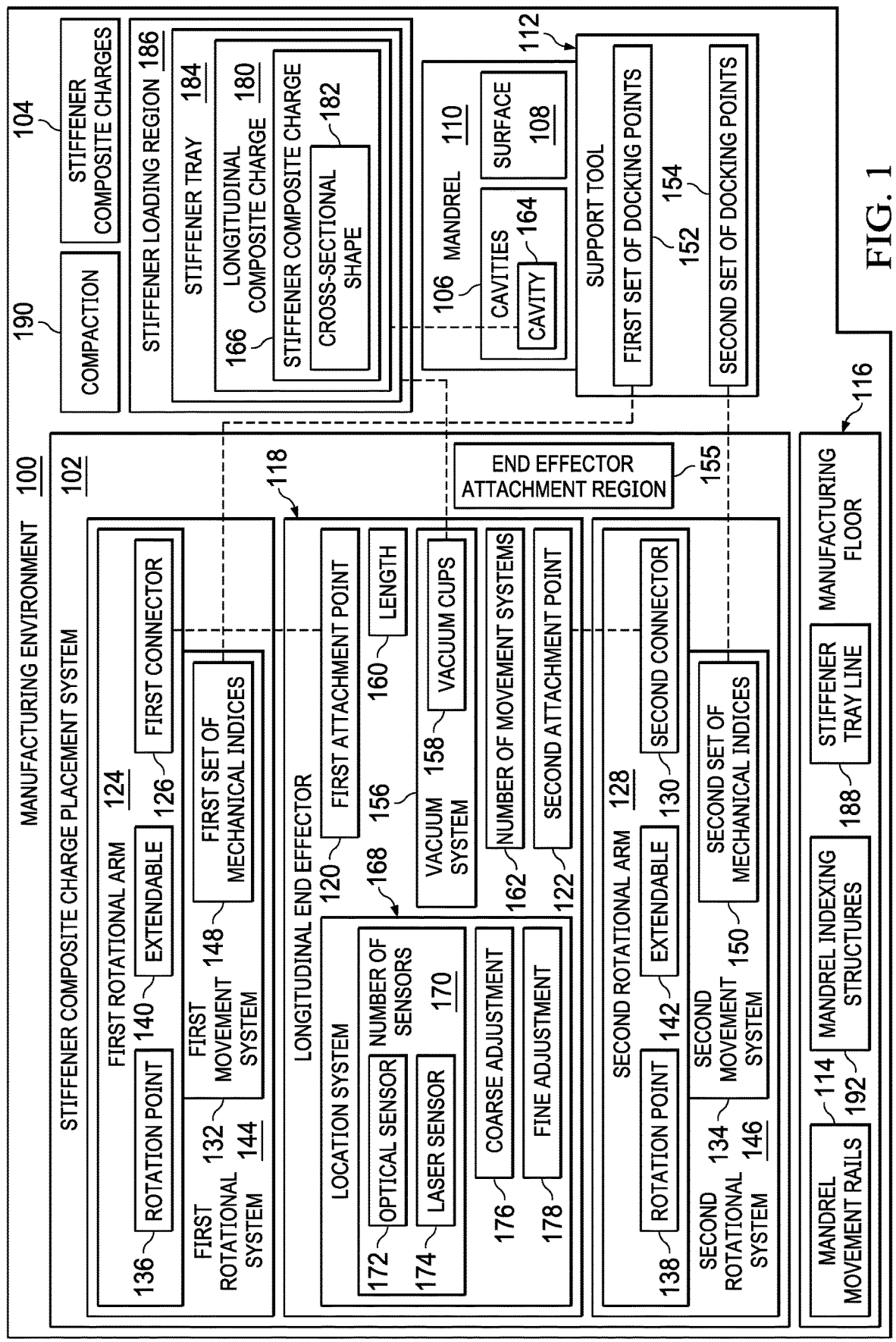
FIG. 1 is an illustration of a block diagram of a manufacturing environment in which a stiffener composite charge application system operates in accordance with an illustrative embodiment.

The illustrative embodiments recognize and take into account one or more different considerations. The illustrative embodiments recognize and take into account that conventional pick and place systems for stiffener composite charges use a gantry and/or a crane to provide pick access. The illustrative embodiments recognize and take into account that conventional crane and/or gantry systems involve extensive investment on building a permanent foundation. Additionally, pillars used to support a gantry may limit access to inserting/removing mandrels and delivering stringers.

The illustrative embodiments also recognize and take into account that a conventional gantry may not be capable of installing stiffener composite charges to all points on a half barrel mandrel. A gantry may be limited to installing stiffener composite charges to a crown (top) region of a half barrel mandrel. A second pick and place station with side-mounted gantries is used to install the remaining stiffener composite charges.

The illustrative embodiments recognize and take into account that a contoured gantry or fixturing to rotate a half barrel mandrel might be used to place stiffener composite charges. However, the design, fabrication, and installation of a contoured gantry or fixturing system may be at least one of undesirably difficult or undesirably expensive.

The illustrative embodiments further recognize and take into account that prior to a gantry placing stiffeners onto a mandrel, the position of the mandrel within a manufacturing environment is determined. The position of the mandrel within the manufacturing environment is used to align the gantry relative to the mandrel. Conventional alignment may be performed using a laser system. The illustrative embodiments recognize and take into account that alignment steps add at least one of time or cost to a manufacturing process. An alignment step may be performed for each gantry tool.

The illustrative embodiments recognize and take into account that it would be desirable to have a stiffener composite charge placement system capable of placing stiffener composite charges within any cavity of a half barrel mandrel. The illustrative embodiments also recognize and take into account that it would be desirable to reduce at least one of manufacturing cost or manufacturing time.

The illustrative embodiments present mobile and segmented equipment that come together around the mandrel tool to place stiffener composite charges into cavities of a mandrel. The equipment components are assembled around the mandrel tool prior to placing the stiffener composite charges into the cavities. After placing the stiffener composite charges, the equipment is disassembled to its segments and transported within the manufacturing environment.

The illustrative examples present a stiffener composite charge placement system. The stiffener composite charge placement system has two extendable rotational arms configured to move a longitudinal end effector around a mandrel. The two extendable rotational arms are capable of placing a stiffener composite charge anywhere on a half barrel mandrel using the longitudinal end effector.

Turning now to FIG. 1, an illustration of a block diagram of a manufacturing environment in which a stiffener composite charge application system operates is depicted in accordance with an illustrative embodiment. Manufacturing environment 100 includes stiffener composite charge placement system 102 configured to place stiffener composite charges 104 into cavities 106 in surface 108 of mandrel 110. Mandrel 110 is supported by support tool 112.

In some illustrative examples, mandrel 110 is a half barrel mandrel. When mandrel 110 is a half barrel mandrel, mandrel 110 is used in manufacturing a half of a fuselage for an aircraft.

Stiffener composite charge placement system 102 is present within manufacturing environment 100 without obstructing movement of mandrel 110 on support tool 112 within manufacturing environment 100. In some illustrative examples, mandrel 110 on support tool 112 moves along mandrel movement rails 114 in manufacturing floor 116 of manufacturing environment 100. In these illustrative examples, components of stiffener composite charge placement system 102 are moved to not obstruct mandrel movement rails 114 when stiffener composite charge placement system 102 is not in use. At least one component of stiffener composite charge placement system 102 is moveable across manufacturing floor 116.

Stiffener composite charge placement system 102 comprises longitudinal end effector 118 having first attachment point 120 and second attachment point 122, first rotational arm 124 having first connector 126 configured to connect to first attachment point 120, and second rotational arm 128 having second connector 130 configured to connect to second attachment point 122. Longitudinal end effector 118 is configured to be connected to first rotational arm 124 and second rotational arm 128.

Stiffener composite charge placement system 102 also includes first movement system 132 configured to move first rotational arm 124 within manufacturing environment 100 and second movement system 134 configured to move second rotational arm 128 within manufacturing environment 100. Rotation point 136 of first rotational arm 124 is mounted on first movement system 132. Rotation point 138 of second rotational arm 128 is mounted on second movement system 134.

First movement system 132 takes any desirable form. First movement system 132 is configured to move first rotational arm 124 within manufacturing environment 100 such that first rotational arm 124 does not obstruct movement of mandrel 110. First movement system 132 is configured to move first rotational arm 124 along manufacturing floor 116. In some illustrative examples, first movement system 132 is an automated guided vehicle. In some illustrative examples, first movement system 132 comprises a rail or track. In some illustrative examples, first movement system 132 includes a telescoping arm.

Second movement system 134 takes any desirable form. Second movement system 134 is configured to move second rotational arm 128 within manufacturing environment 100 such that second rotational arm 128 does not obstruct movement of mandrel 110. Second movement system 134 is configured to move second rotational arm 128 along manufacturing floor 116. In some illustrative examples, second movement system 134 is an automated guided vehicle. In some illustrative examples, second movement system 134 comprises a rail or track. In some illustrative examples, second movement system 134 includes a telescoping arm.

First rotational arm 124 is extendable 140 relative to rotation point 136 of first rotational arm 124. Second rotational arm 128 is extendable 142 relative to rotation point 138 of second rotational arm 128.

First rotational system 144 comprises first rotational arm 124 mounted on first movement system 132 configured to relocate first rotational arm 124 within manufacturing environment 100. After first rotational system 144 relocates first rotational arm 124 within manufacturing environment 100, first rotational arm 124 is extended to connect first connector 126 to first attachment point 120.

Second rotational system 146 comprises second rotational arm 128 mounted on second movement system 134 configured to relocate second rotational arm 128 within manufacturing environment 100. After second rotational system 146 relocates second rotational arm 128 within manufacturing environment 100, second rotational arm 128 is extended to connect second connector 130 to second attachment point 122.

First rotational system 144 and second rotational system 146 are configured to be indexed and connected to support tool 112 configured to support mandrel 110. First movement system 132 has a first set of mechanical indices 148 configured to interface with first set of docking points 152 of support tool 112 configured to support mandrel 110. As used herein, a "set" of items includes one or more items. For example, first set of mechanical indices 148 includes one or more mechanical indices. Second movement system 134 has second set of mechanical indices 150 configured to interface with second set of docking points 154 of support tool 112. First set of mechanical indices 148 and second set of mechanical indices 150 take any desirable form to interface and connect to first set of docking points 152 and second set of docking points 154.

By connecting first set of mechanical indices 148 to first set of docking points 152, first rotational system 144 is indexed relative to support tool 112. By connecting second set of mechanical indices 150 to second set of docking points 154, second rotational system 146 is indexed relative to support tool 112.

By indexing first rotational system 144 relative to support tool 112, the position of first rotational arm 124 relative to mandrel 110 is known. By indexing first rotational system 144 relative to support tool 112, a separate alignment step may be eliminated.

By indexing second rotational system 146 to support tool 112, the position of second rotational arm 128 relative to mandrel 110 is known. By indexing second rotational system 146 to support tool 112, a separate alignment step may be eliminated.

After docking first rotational system 144 and second rotational system 146, first rotational arm 124 and second rotational arm 128 are connected to longitudinal end effector 118. Prior to connecting first rotational arm 124 and second rotational arm 128 to longitudinal end effector 118, longitudinal end effector 118 is parked in end effector attachment region 155. End effector attachment region 155 is positioned on manufacturing floor 116 such that longitudinal end effector 118 does not interfere with movement of support tool 112 and mandrel 110 on mandrel movement rails 114. After docking first rotational system 144 and second rotational system 146, first rotational arm 124 and second rotational arm 128 are each extended to connect to longitudinal end effector 118.

Longitudinal end effector 118 has vacuum system 156 configured to apply a flow to lift a stiffener composite charge. Longitudinal end effector 118 comprises plurality of vacuum cups 158 distributed along length 160 of longitudinal end effector 118. In some illustrative examples, vacuum system 156 comprises high-flow manifold system. In these illustrative examples, plurality of vacuum cups 158 are components of high-flow manifold system. Plurality of vacuum cups 158 are components of vacuum system 156. To lift a stiffener composite charge, vacuum is applied through plurality of vacuum cups 158 while plurality of vacuum cups 158 is in contact with the stiffener composite charge.

Longitudinal end effector 118 further comprises number of movement systems 162 configured to change an orientation of plurality of vacuum cups 158 relative to manufacturing floor 116. As used herein, a "number" of items is one or more items. For example, number of movement systems 162 includes one or more movement systems.

Longitudinal end effector 118 comprises number of movement systems 162 configured to move longitudinal end effector 118 independently of first rotational arm 124 and second rotational arm 128. Number of movement systems 162 is used to orient a stiffener composite charge relative to a desired cavity.

Cavity 164 is one of cavities 106 in surface 108 of mandrel 110. To position stiffener composite charge 166 of stiffener composite charges 104 within cavity 164, longitudinal end effector 118 applies vacuum to plurality of vacuum cups 158 to lift stiffener composite charge 166. After longitudinal end effector 118 lifts stiffener composite charge 166, first rotational arm 124 and second rotational arm 128 rotates longitudinal end effector 118 around mandrel 110 until longitudinal end effector 118 is positioned near cavity 164. Number of movement systems 162 rotates longitudinal end effector 118 relative to first rotational arm 124 and second rotational arm 128 such that stiffener composite charge 166 can be placed into cavity 164. Number of movement systems 162 rotates longitudinal end effector 118 relative to first rotational arm 124 and second rotational arm 128 such that plurality of vacuum cups 158 is normal to cavity 164.

Longitudinal end effector 118 further comprises location system 168 having number of sensors 170 configured to position longitudinal end effector 118 relative to a stiffener composite charge. Prior to lifting stiffener composite charge 166, longitudinal end effector 118 uses location system 168 to position longitudinal end effector 118 relative to stiffener composite charge 166.

Number of sensors 170 comprises at least one of optical sensor 172 or laser sensor 174. In some illustrative examples, results from number of sensors 170 may be used to perform at least one of coarse adjustment 176 or fine adjustment 178. Coarse adjustment 176 includes larger movements of longitudinal end effector 118. Fine adjustment 178 includes smaller movements of longitudinal end effector 118. In some illustrative examples, optical sensor 172 is used for coarse adjustment 176. In some illustrative examples, laser sensor 174 is used for fine adjustment 178. In some illustrative examples, optical sensor 172 is used to position longitudinal end effector 118 along the length of stiffener composite charge 166. In some illustrative examples, laser sensor 174 is used to position an angle of longitudinal end effector 118 relative to cross-sectional shape 182 of stiffener composite charge 166.

Stiffener composite charge 166 is longitudinal composite charge 180 with cross-sectional shape 182. Cross-sectional shape 182 is formed into stiffener composite charge 166 using stiffener tray 184. In some illustrative examples, stiffener composite charge 166 is transported in stiffener tray 184 within manufacturing environment 100.

Longitudinal end effector 118 lifts stiffener composite charge 166 from stiffener tray 184 in stiffener loading region 186. Stiffener composite charge 166 is delivered to stiffener loading region 186 in any desirable fashion. In some illustrative examples, stiffener composite charge 166 within stiffener tray 184 is placed within stiffener loading region 186 by an operator. In some illustrative examples, stiffener composite charge 166 within stiffener tray 184 is delivered to stiffener loading region 186 by stiffener tray line 188. Stiffener tray line 188 takes any desirable form. In some illustrative examples, stiffener tray line 188 may be at least one of a conveyor belt, a track, a roller conveyance system, or any other desirable type of conveyance.

When longitudinal end effector 118 is positioned relative to cavity 164, first rotational arm 124 and second rotational arm 128 are retracted to place stiffener composite charge 166 into cavity 164. In some illustrative examples, number of movement systems 162 moves at least a portion of longitudinal end effector 118 towards cavity 164 to apply compaction 190 to stiffener composite charge 166. Stiffener composite charge 166 is compacted in cavity 164 by moving components of longitudinal end effector 118 normal to cavity 164 while first rotational arm 124 and second rotational arm 128 are stationary. In some illustrative examples, components of longitudinal end effector 118 moved normal to cavity 164 include plurality of vacuum cups 158.

In some alternative illustrative examples, first rotational arm 124 and second rotational arm 128 are further retracted to apply compaction 190 to stiffener composite charge 166. In these illustrative examples, first rotational arm 124 and second rotational arm 128 retract to move longitudinal end effector 118 towards cavity 164 to apply compaction 190 to stiffener composite charge 166. In these illustrative examples, stiffener composite charge 166 is compacted in cavity 164 by moving longitudinal end effector 118 normal to cavity 164 by retracting first rotational arm 124 and second rotational arm 128.

In some illustrative examples, mandrel indexing structures 192 are present on manufacturing floor 116. In these illustrative examples, mandrel indexing structures 192 are configured to desirably position support tool 112 and mandrel 110 within manufacturing environment 100. In these illustrative examples, mandrel indexing structures 192 are configured to desirably position support tool 112 and mandrel 110 relative to end effector attachment region 155.

Stiffener composite charge placement system 102 provides placement of stiffener composite charges 104 onto mandrel 110 without use of a gantry. Stiffener composite charge placement system 102 provides placement of stiffener composite charges 104 onto mandrel 110 without permanent foundations or pillars installed in manufacturing environment 100.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, stiffener tray line 188 may not be present. In other illustrative examples, mandrel indexing structures 192 may not be present.

As another example, although first set of mechanical indices 148 and second set of mechanical indices 150 are described, first rotational system 144 and second rotational system 146 may be indexed relative to support tool 112 in any desirable fashion. First rotational system 144 and second rotational system 146 have any desirable indexing and alignment systems. In some illustrative examples, first rotational system 144 and second rotational system 146 have optical indexing systems to align each of first rotational system 144 and second rotational system 146 relative to support tool 112.

Figure 2:
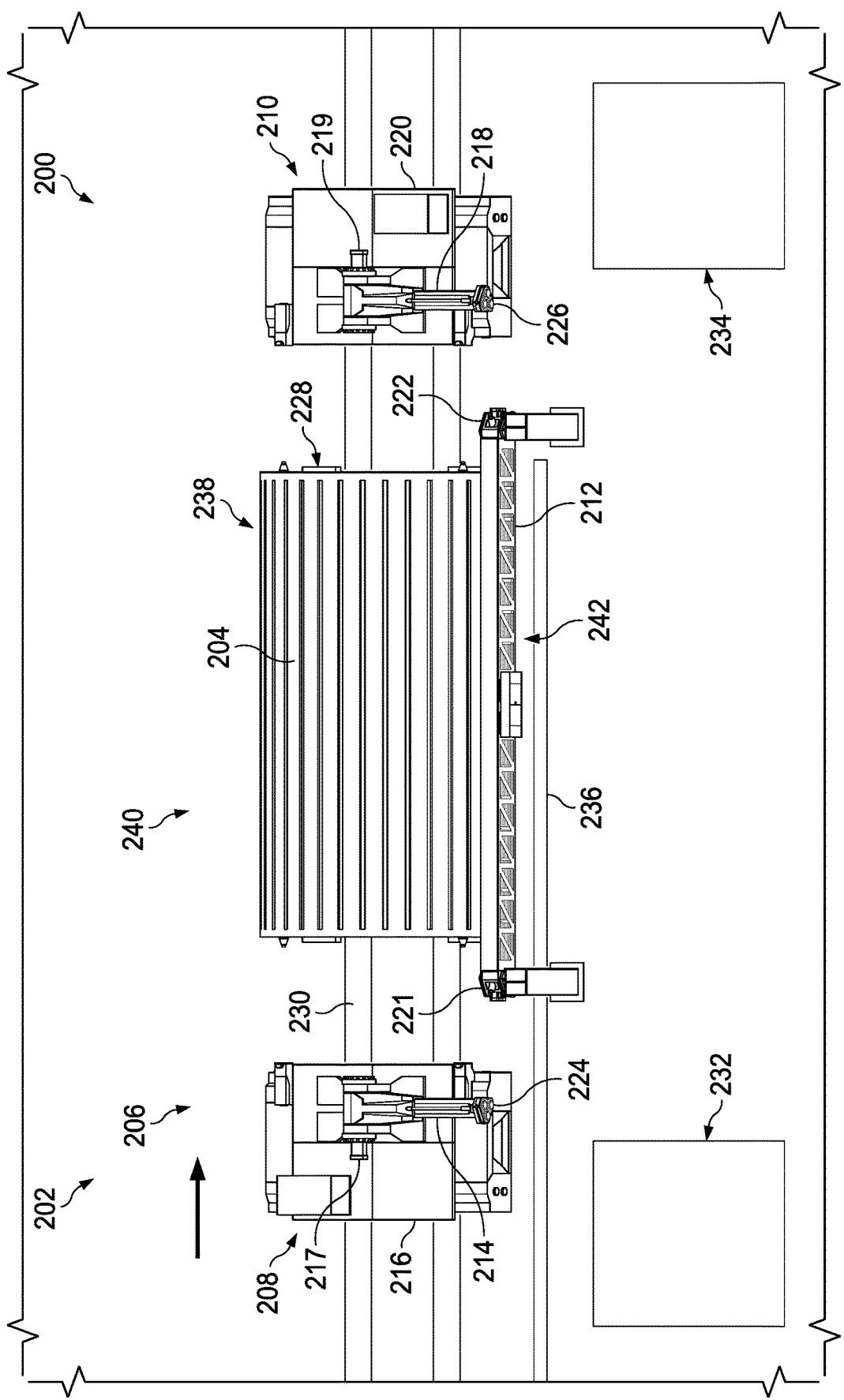
FIG. 2 is an illustration of a top view of a stiffener composite charge application system in a manufacturing environment in accordance with an illustrative embodiment.

Turning now to FIG. 2, an illustration of a top view of a stiffener composite charge application system in a manufacturing environment is depicted in accordance with an illustrative embodiment. Manufacturing environment 200 is a physical implementation of manufacturing environment 100 of FIG. 1. In view 202, mandrel 204 and stiffener composite charge placement system 206 are present in manufacturing environment 200. Stiffener composite charge placement system 206 comprises first rotational system 208, second rotational system 210, and longitudinal end effector 212. First rotational system 208 comprises first rotational arm 214 mounted on first movement system 216 configured to relocate first rotational arm 214 within manufacturing environment 200. First movement system 216 is configured to move first rotational arm 214 within manufacturing environment 200. Rotation point 217 of first rotational arm 214 is mounted on first movement system 216.

Second rotational system 210 comprises second rotational arm 218 mounted on second movement system 220 configured to relocate second rotational arm 218 within manufacturing environment 200. Second movement system 220 is configured to move second rotational arm 218 within manufacturing environment 200. Rotation point 219 of second rotational arm 218 is mounted on second movement system 220.

Longitudinal end effector 212 is configured to be connected to first rotational arm 214 and second rotational arm 218. Longitudinal end effector 212 has first attachment point 221 and second attachment point 222. First rotational arm 214 has first connector 224 configured to connect to first attachment point 221. Second rotational arm 218 having second connector 226 configured to connect to second attachment point 222.

First rotational system 208 and second rotational system 210 are configured to be indexed and connected to support tool 228 configured to support mandrel 204. First movement system 216 has a first set of mechanical indices configured to interface with a first set of docking points of support tool 228. Second movement system 220 has a second set of mechanical indices configured to interface with a second set of docking points of support tool 228.

Although a first set of mechanical indices and a second set of mechanical indices are described, first movement system 216 and second movement system 220 may be indexed relative to support tool 228 in any desirable fashion. First movement system 216 and second movement system 220 have any desirable indexing and alignment systems. In some illustrative examples, first movement system 216 and second movement system 220 have optical indexing systems to align each of first movement system 216 and second movement system 220 relative to support tool 228.

By first movement system 216 and second movement system 220 connecting to support tool 228, alignment of mandrel 204 relative to first rotational arm 214 and second rotational arm 218 is automatic. A separate alignment step need not be performed. By self-aligning mandrel 204 and stiffener composite charge placement system 206 using the mechanical indexing, visual referencing may be reduced or eliminated.

First rotational arm 214 and second rotational arm 218 are configured to lift and rotate longitudinal end effector 212 around mandrel 204. Longitudinal end effector 212 comprises a number of movement systems configured to move longitudinal end effector 212 independently of first rotational arm 214 and second rotational arm 218.

First rotational arm 214 is extendable relative to rotation point 217 of first rotational arm 214. Second rotational arm 218 is extendable relative to rotation point 219 of second rotational arm 218.

Mandrel 204 on support tool 228 is moved within manufacturing environment 200 on mandrel movement rails 230. Components of stiffener composite charge placement system 206 do not prevent movement of mandrel 204 on support tool 228 within manufacturing environment 200. First movement system 216 and second movement system 220 are configured to move first rotational arm 214 and second rotational arm 218 off of mandrel movement rails 230. Area 232 is a possible parking location for first rotational system 208. Area 234 is a possible parking location for second rotational system 210.

Area 232 and area 234 are each positioned so that support tool 228 and mandrel 204 can move freely along mandrel movement rails 230. Area 232 and area 234 are each positioned so that first movement system 216 and second movement system 220 are not positioned over stiffener tray line 236. Stiffener tray line 236 is a delivery system for stiffener composite charges in stiffener trays. Stiffener tray line 236 takes any desirable form. In some illustrative examples, stiffener tray line 236 is a rail, track, or conveyor.

In operation, support tool 228 and mandrel 204 are transported along mandrel movement rails 230 to position 238. In some illustrative examples, indexing features may be present on manufacturing floor 240 for positioning support tool 228 at position 238 on manufacturing floor 240. Position 238 is a desired location for support tool 228 to receive composite charges from stiffener composite charge placement system 206.

After support tool 228 is stopped at position 238, portions of stiffener composite charge placement system 206 are moved within manufacturing environment 200. First rotational system 208 is moved from area 232 to cover mandrel movement rails 230. Second rotational system 210 is moved from area 234 to cover mandrel movement rails 230.

First rotational system 208 is docked to support tool 228 supporting mandrel 204. Second rotational system 210 is docked to support tool 228 supporting mandrel 204.

After docking first rotational system 208 and second rotational system 210, first rotational arm 214 and second rotational arm 218 are extended towards longitudinal end effector 212. First connector 224 of first rotational arm 214 connects to first attachment point 221 of longitudinal end effector 212. Second connector 226 of second rotational arm 218 connects to second attachment point 222 of longitudinal end effector 212.

After first rotational arm 214 and second rotational arm 218 connect to longitudinal end effector 212, longitudinal end effector 212 picks up a composite charge using its vacuum system. Once the composite charge is held by longitudinal end effector 212, first rotational arm 214 and second rotational arm 218 lift and rotate longitudinal end effector 212 around mandrel 204. First rotational arm 214 and second rotational arm 218 position longitudinal end effector 212 relative to a desired cavity of mandrel 204. At least a portion of longitudinal end effector 212 is rotated independently of first rotational arm 214 and second rotational arm 218 using movement systems of longitudinal end effector 212 to desirably orient the composite charge relative to the cavity. First rotational arm 214 and second rotational arm 218 are then retracted to place the composite charge into the cavity.

After the composite charge is placed into the desired cavity, first rotational arm 214 and second rotational arm 218 extend and then rotate longitudinal end effector 212 around mandrel 204 towards stiffener tray line 236. Longitudinal end effector 212 will then lift the next composite charge delivered on stiffener tray line 236, and the rotation and placement process using first rotational arm 214 and second rotational arm 218 will be repeated.

After all composite charges are placed onto mandrel 204, first rotational arm 214 and second rotational arm 218 park longitudinal end effector 212 over stiffener tray line 236 in position 242. First rotational arm 214 and second rotational arm 218 then disconnect from longitudinal end effector 212 and retract. After retracting first rotational arm 214 and second rotational arm 218, first rotational system 208 is moved away from mandrel movement rails 230. First rotational system 208 may be moved to area 232. Second rotational system 210 is moved away from mandrel movement rails 230. Second rotational system 210 may be moved to area 234.

After moving first rotational system 208 and second rotational system 210 off of mandrel movement rails 230, mandrel 204 on support tool 228 is moved within manufacturing environment 200 on mandrel movement rails 230. For example, mandrel 204 on support tool 228 may be moved on mandrel movement rails 230 to another station within manufacturing environment 200.

In some illustrative examples, after moving mandrel 204 on support tool 228 to another station, a second mandrel on a second support tool is moved along mandrel movement rails 230 within manufacturing environment. In these illustrative examples, the second mandrel and second support tool are stopped at position 238 and composite charges are placed onto the second mandrel using longitudinal end effector 212, first rotational arm 214, and second rotational arm 218.

Figure 3:
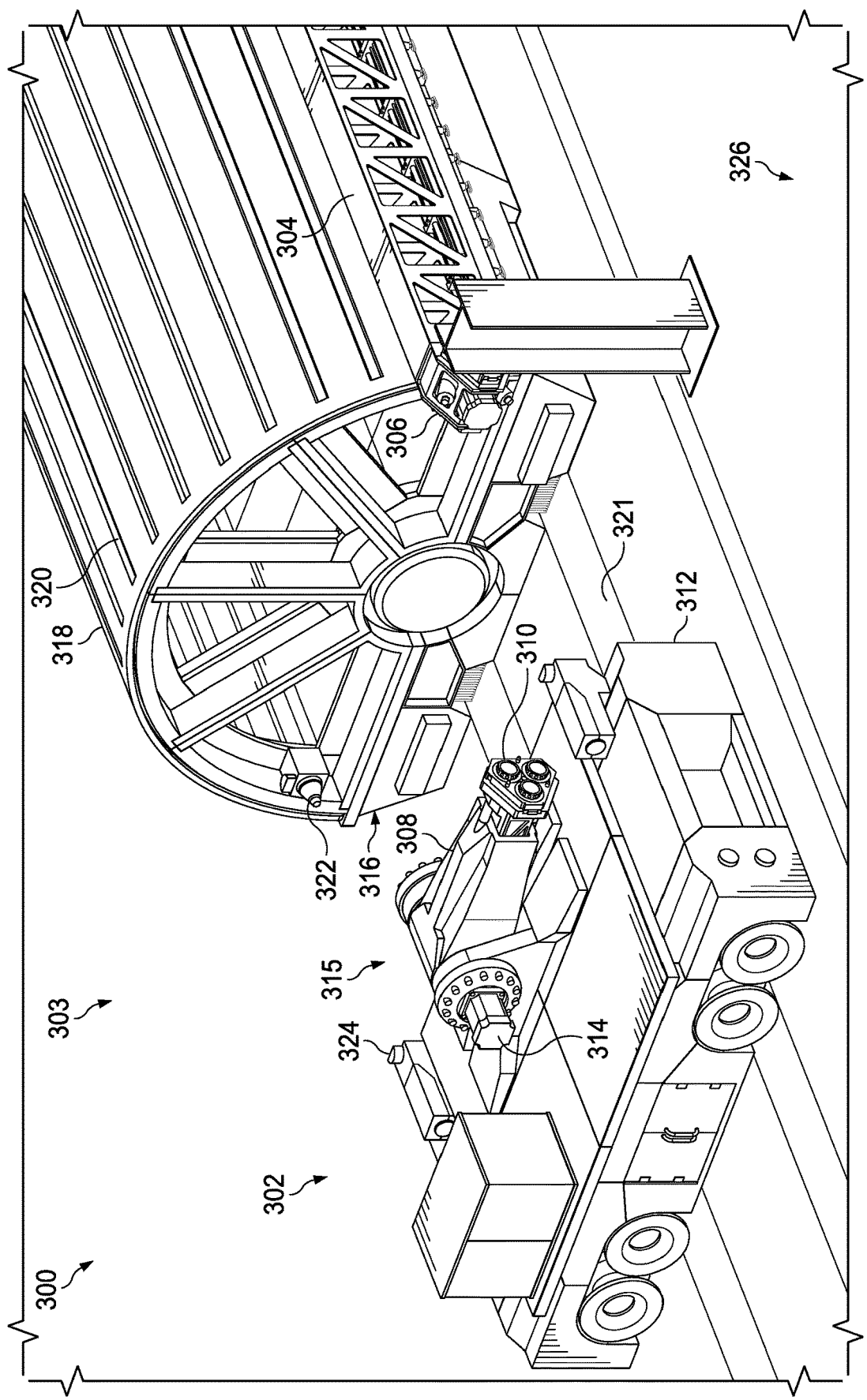
FIG. 3 is an illustration of an isometric view of a mandrel and components of a stiffener composite charge application system in a manufacturing environment in accordance with an illustrative embodiment.

Turning now to FIG. 3, an illustration of an isometric view of a mandrel and components of a stiffener composite charge application system in a manufacturing environment is depicted in accordance with an illustrative embodiment. View 300 is a view of components of stiffener composite charge placement system 302 in manufacturing environment 303. Stiffener composite charge placement system 302 comprises longitudinal end effector 304 having first attachment point 306 and first rotational arm 308 having first connector 310 configured to connect to first attachment point 306. Stiffener composite charge placement system 302 further comprises first movement system 312 configured to move first rotational arm 308 within manufacturing environment 303. Rotation point 314 of first rotational arm 308 is mounted on first movement system 312. First rotational arm 308 is extendable relative to rotation point 314 of first rotational arm 308. First rotational arm 308 and first movement system 312 form first rotational system 315.

Support tool 316 is configured to support mandrel 318 with cavities 320. As depicted, mandrel 318 is a half barrel mandrel used for manufacturing half of a fuselage for an aircraft.

Support tool 316 and mandrel 318 is moved within manufacturing environment 303 on mandrel movement rails 321. First movement system 312 is not present on mandrel movement rails 321 when support tool 316 is moved on mandrel movement rails 321. First movement system 312 is moveable within manufacturing environment 303 to position first rotational arm 308 relative to support tool 316 for composite charge placement. First movement system 312 is moveable within manufacturing environment 303 to move first movement system 312 off of mandrel movement rails 321.

Support tool 316 has first set of docking points 322. First movement system 312 has first set of mechanical indices 324 configured to interface with first set of docking points 322 of support tool 316. In some illustrative examples, support tool 316 is manufactured with first set of docking points 322. In other illustrative examples, first set of docking points 322 is a retrofit added to support tool 316 after manufacturing. In some illustrative examples, pre-existing support tools may be used with stiffener composite charge placement system 302 by adding docking points in a retrofit.

First set of mechanical indices 324 and first set of docking points 322 provide indexing between mandrel 318 and stiffener composite charge placement system 302. By indexing mandrel 318 and stiffener composite charge placement system 302, additional alignment steps are reduced or eliminated. For example, by indexing mandrel 318 and stiffener composite charge placement system 302 manually, an inspection of the position of mandrel 318 within manufacturing environment 303 may not be performed.

In some illustrative examples, additional indexing features are present in manufacturing environment 303. For example, indexing features may be present on manufacturing floor 326 for positioning support tool 316 on manufacturing floor 326.

Figure 4:
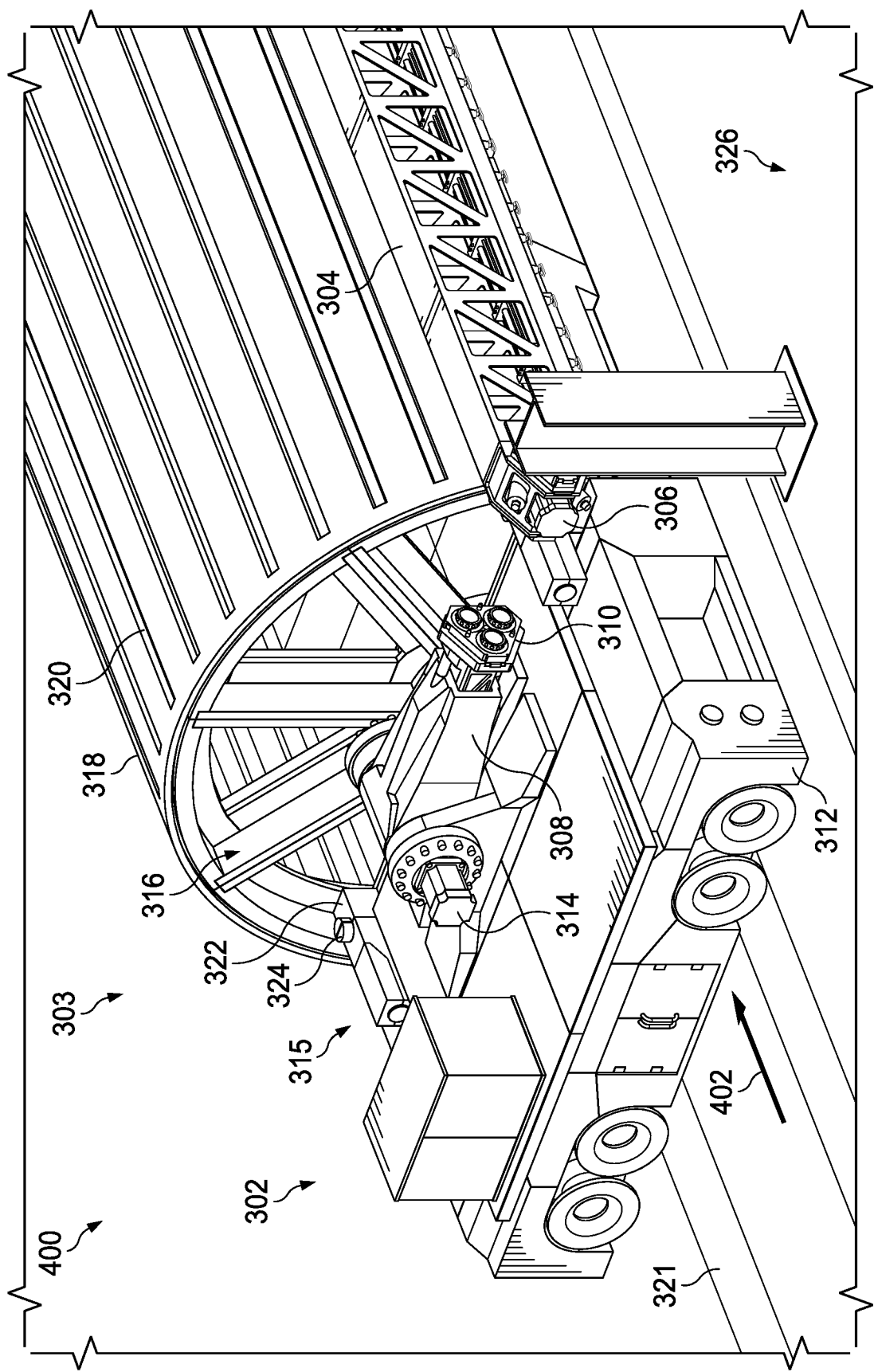
FIG. 4 is an illustration of an isometric view of a mandrel and components of a stiffener composite charge application system in a manufacturing environment in accordance with an illustrative embodiment.

Turning now to FIG. 4 is an illustration of an isometric view of a mandrel and components of a stiffener composite charge application system in a manufacturing environment is depicted in accordance with an illustrative embodiment. View 400 is a view of stiffener composite charge placement system 302 after first rotational system 315 has docked with support tool 316. To dock first rotational system 315 to support tool 316, first movement system 312 moved in direction 402 between view 400 and view 300 of FIG. 3.

Figure 5:
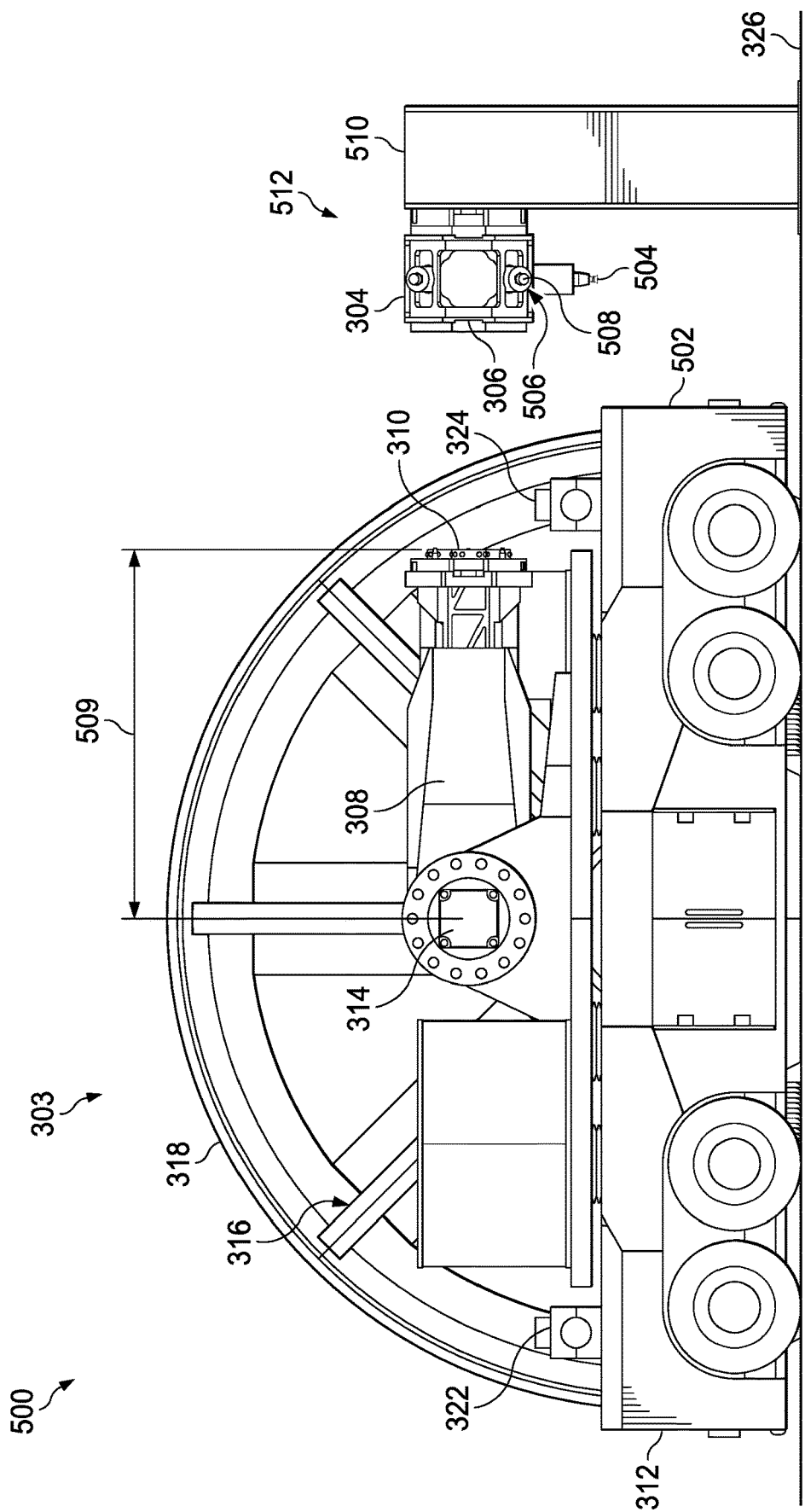
FIG. 5 is an illustration of a side view of a mandrel and components of a stiffener composite charge application system in a manufacturing environment in accordance with an illustrative embodiment.

Turning now to FIG. 5, an illustration of a side view of a mandrel and components of a stiffener composite charge application system in a manufacturing environment is depicted in accordance with an illustrative embodiment. View 500 is a side view of FIG. 4. As depicted, first movement system 312 takes the form of automated guided vehicle 502.

Additional components of longitudinal end effector 304 are visible in view 500. Longitudinal end effector 304 has plurality of vacuum cups 504. Plurality of vacuum cups 504 are part of a vacuum system of longitudinal end effector 304 configured to apply a flow to lift a stiffener composite charge. The flow through the vacuum system holds the stiffener composite charge against plurality of vacuum cups 504. Applying a vacuum through longitudinal end effector 304 holds the stiffener composite charge against plurality of vacuum cups 504 until the flow is stopped.

Longitudinal end effector 304 also has number of sensors 506 configured to position longitudinal end effector 304 relative to a stiffener composite charge. In some illustrative examples, number of sensors 506 comprises at least one of an optical sensor or a laser sensor. As depicted, sensor 508 of number of sensors 506 is an optical sensor.

In view 500, first rotational arm 308 is not connected to longitudinal end effector 304. In view 500, first rotational arm 308 is fully retracted and has length 509.

In view 500, longitudinal end effector 304 is parked on support structure 510 in end effector attachment region 512. End effector attachment region 512 is positioned on manufacturing floor 326 such that support tools and mandrels, such as support tool 316 and mandrel 318 may move past end effector attachment region 512. End effector attachment region 512 does not interfere with movements of support tool 316 and mandrel 318 on manufacturing floor 326.

Figure 6:
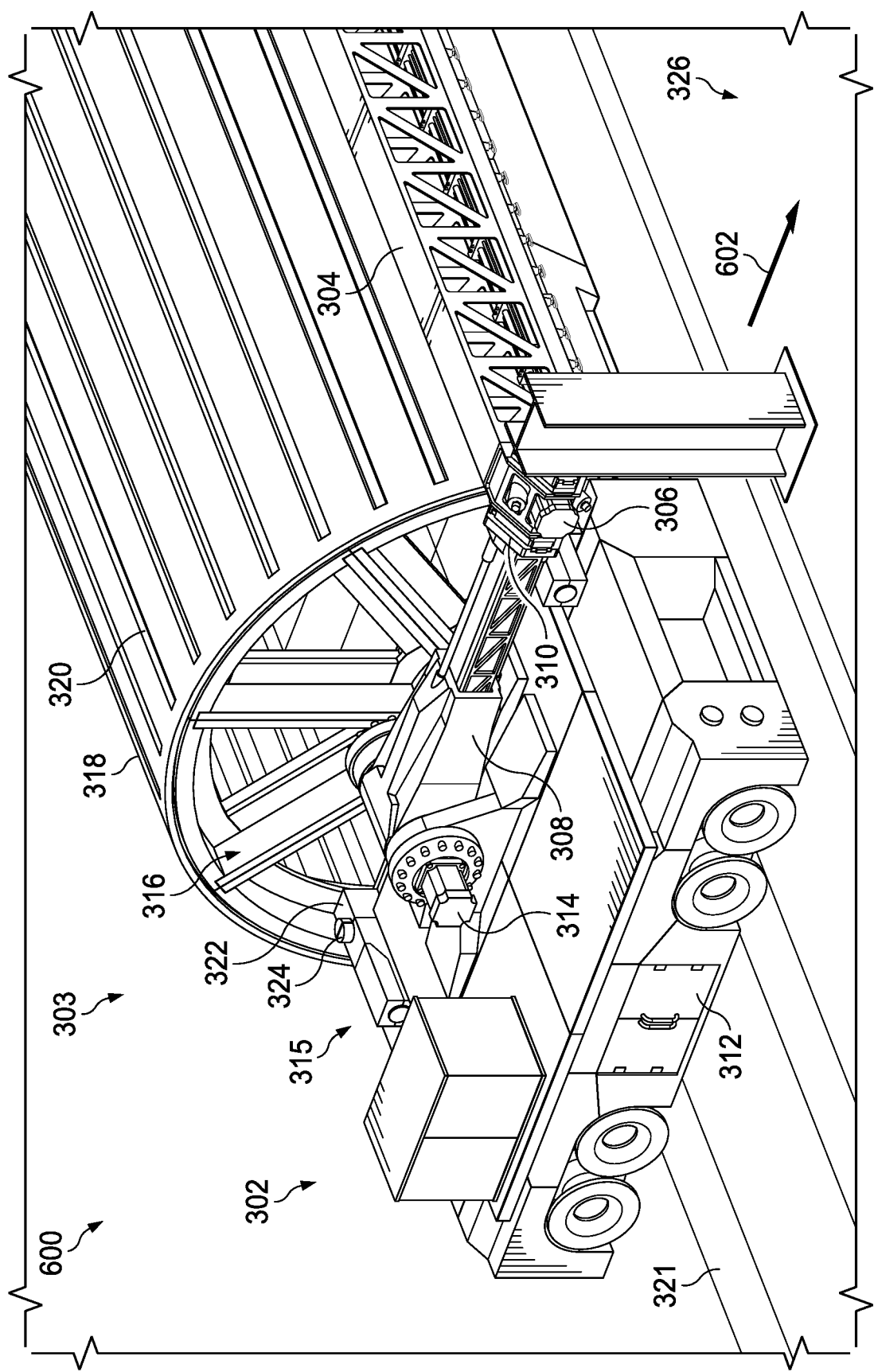
FIG. 6 is an illustration of an isometric view of a mandrel and components of a stiffener composite charge application system in a manufacturing environment in accordance with an illustrative embodiment.

Turning now to FIG. 6, an illustration of an isometric view of a mandrel and components of a stiffener composite charge application system in a manufacturing environment is depicted in accordance with an illustrative embodiment. Between view 400 and view 600, first rotational arm 308 has been extended towards longitudinal end effector 304. Between view 400 and view 600, first rotational arm 308 has been extended in direction 602. First connector 310 of first rotational arm 308 has been connected to first attachment point 306 of longitudinal end effector 304.

Although not visible in FIG. 6, stiffener composite charge placement system 302 also has a second rotational arm having a second connector configured to connect to a second attachment point of longitudinal end effector 304. Once first rotational arm 308 and the second rotational arm are connected to longitudinal end effector 304, longitudinal end effector 304 is used to lift and place a stiffener composite charge.

Figure 7:
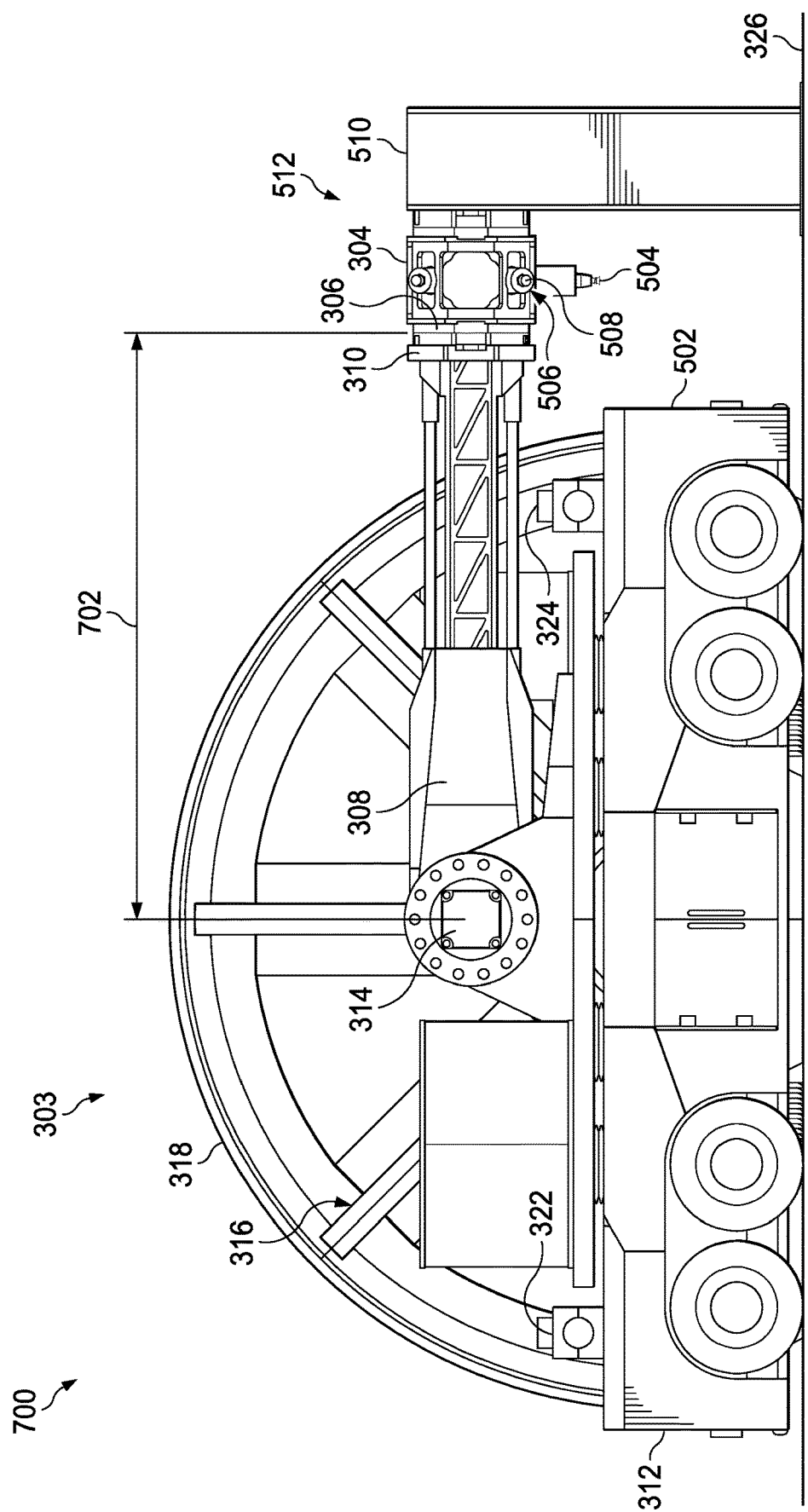
FIG. 7 is an illustration of a side view of a mandrel and components of a stiffener composite charge application system in a manufacturing environment in accordance with an illustrative embodiment.

Turning now to FIG. 7, an illustration of a side view of a mandrel and components of a stiffener composite charge application system in a manufacturing environment is depicted in accordance with an illustrative embodiment. View 700 is a side view of FIG. 6.

In view 700, length 702 of first rotational arm 308 is greater than length 509 of first rotational arm 308 in FIG. 5. In operating stiffener composite charge placement system 302, first rotational arm 308 may change length between length 509 of FIG. 5 and length 702. In some illustrative examples, to rotate longitudinal end effector 304 about mandrel 318, first rotational arm 308 may extend to a length greater than length 702. In some illustrative examples, first rotational arm 308 may rotate approximately 180 degrees about rotation point 314 to place a desired stiffener composite charge in a desired cavity located at any point on mandrel 318.

The illustrations of stiffener composite charge placement system 302, support tool 316, and mandrel 318 in FIGS. 3-8 are not meant to imply physical or architectural limitations to the manner in which an illustrative embodiment may be implemented. Other components in addition to or in place of the ones illustrated may be used. Some components may be unnecessary.

For example, first movement system 312 need not take the form of automated guided vehicle 502. In other non-depicted examples, first movement system 312 may include any desirable type of movement system configured to move first rotational arm 308 relative to manufacturing floor 326. In other illustrative examples, a first movement system may include tracks and a carriage. In other illustrative examples, a first movement system may include a telescoping section.

First movement system 312 is configured to not obstruct mandrel movement rails 321 when stiffener composite charge placement system 302 is not placing composite charges. First movement system 312 is configured to move first rotational arm 308 off of mandrel movement rails 321 when stiffener composite charge placement system 302 is not placing composite charges.

As another example, mandrel 318 may not be a half barrel mandrel. Mandrel 318 may have any desirable shape that may be reached by the 180 degree rotation of first rotational arm 308. Further, mandrel 318 has any desirable size. As first rotational arm 308 can change length, first rotational arm 308 can be used with mandrels with a smaller or a larger diameter than mandrel 318. As yet another example, support tool 316 may have a different type of docking mechanism other than first set of docking points 322.

Figure 8:
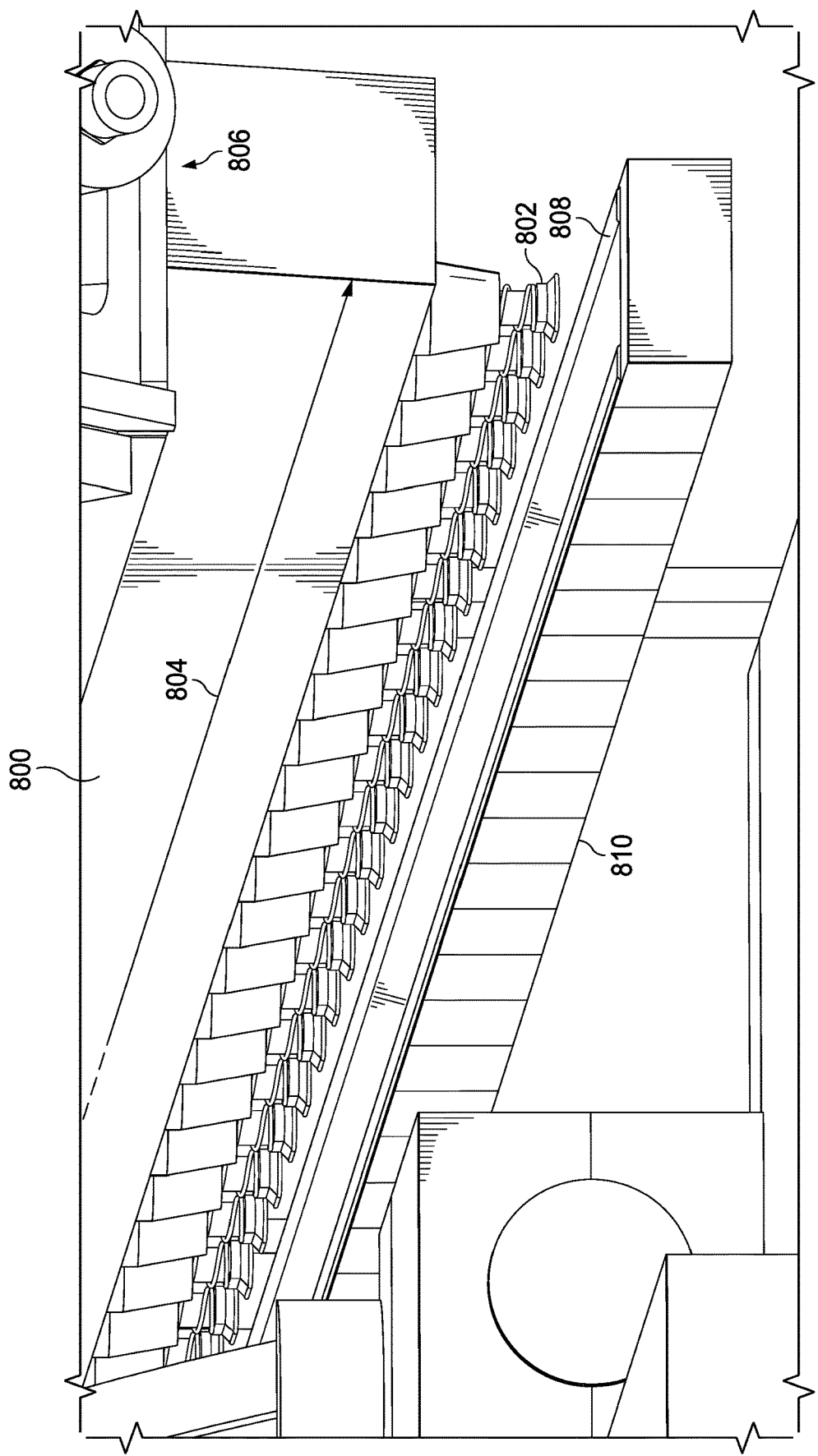
FIG. 8 is an illustration of an isometric view of a longitudinal end effector above a composite charge in a stiffener tray in accordance with an illustrative embodiment.

Turning now to FIG. 8, an illustration of an isometric view of a longitudinal end effector above a composite charge in a stiffener tray is depicted in accordance with an illustrative embodiment. Longitudinal end effector 800 is a physical implementation of longitudinal end effector 118 of FIG. 1. Longitudinal end effector 800 comprises plurality of vacuum cups 802 distributed along length 804 of longitudinal end effector 800. Longitudinal end effector 800 also has number of movement systems 806 configured to change an orientation of plurality of vacuum cups 802 relative to a manufacturing floor.

Longitudinal end effector 800 further comprises a location system (not depicted) having a number of sensors configured to position longitudinal end effector 800 relative to stiffener composite charge 808. In some illustrative examples, the number of sensors comprise at least one of an optical sensor or a laser sensor.

As depicted, stiffener composite charge 808 is present in stiffener tray 810. Stiffener tray 810 is used to shape and/or transport stiffener composite charge 808 within a manufacturing environment. Stiffener tray 810 is transported within manufacturing environment in any desirable fashion. In some illustrative examples, stiffener tray 810 is transported on a stiffener tray line, such as a conveyor belt or a track. In some illustrative examples, a stiffener tray line runs beneath an end effector attachment region. In some illustrative examples, stiffener tray 810 is positioned beneath longitudinal end effector 800.

Figure 9:
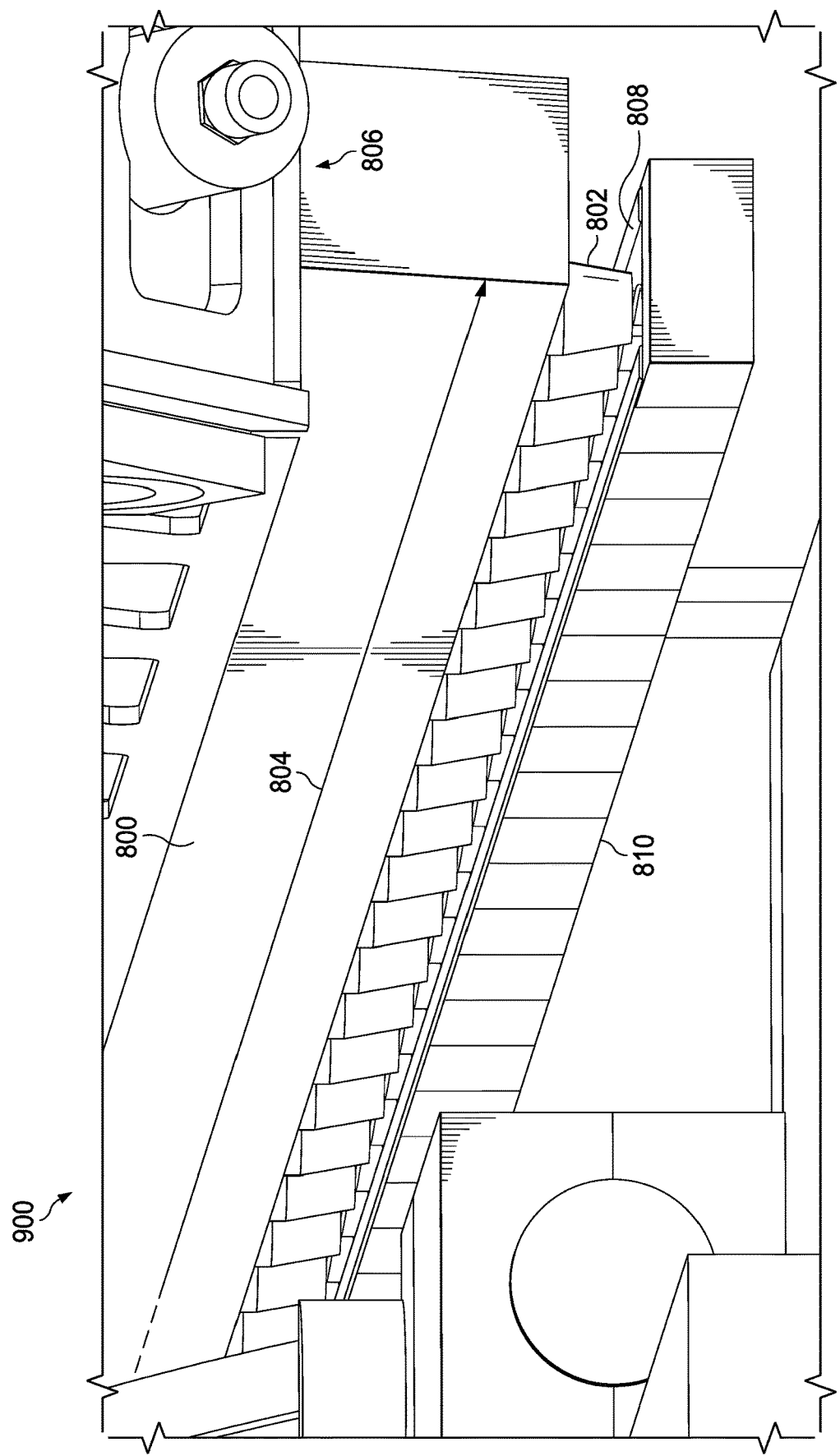
FIG. 9 is an illustration of an isometric view of a longitudinal end effector in contact with a composite charge in a stiffener tray in accordance with an illustrative embodiment.

Turning now to FIG. 9, an illustration of an isometric view of a longitudinal end effector in contact with a composite charge in a stiffener tray is depicted in accordance with an illustrative embodiment. In view 900 of longitudinal end effector 800, plurality of vacuum cups 802 has been moved in direction 902. Plurality of vacuum cups 802 is moved using number of movement systems 806. In view 900, plurality of vacuum cups 802 is in contact with stiffener composite charge 808 within stiffener tray 810.

Figure 10:
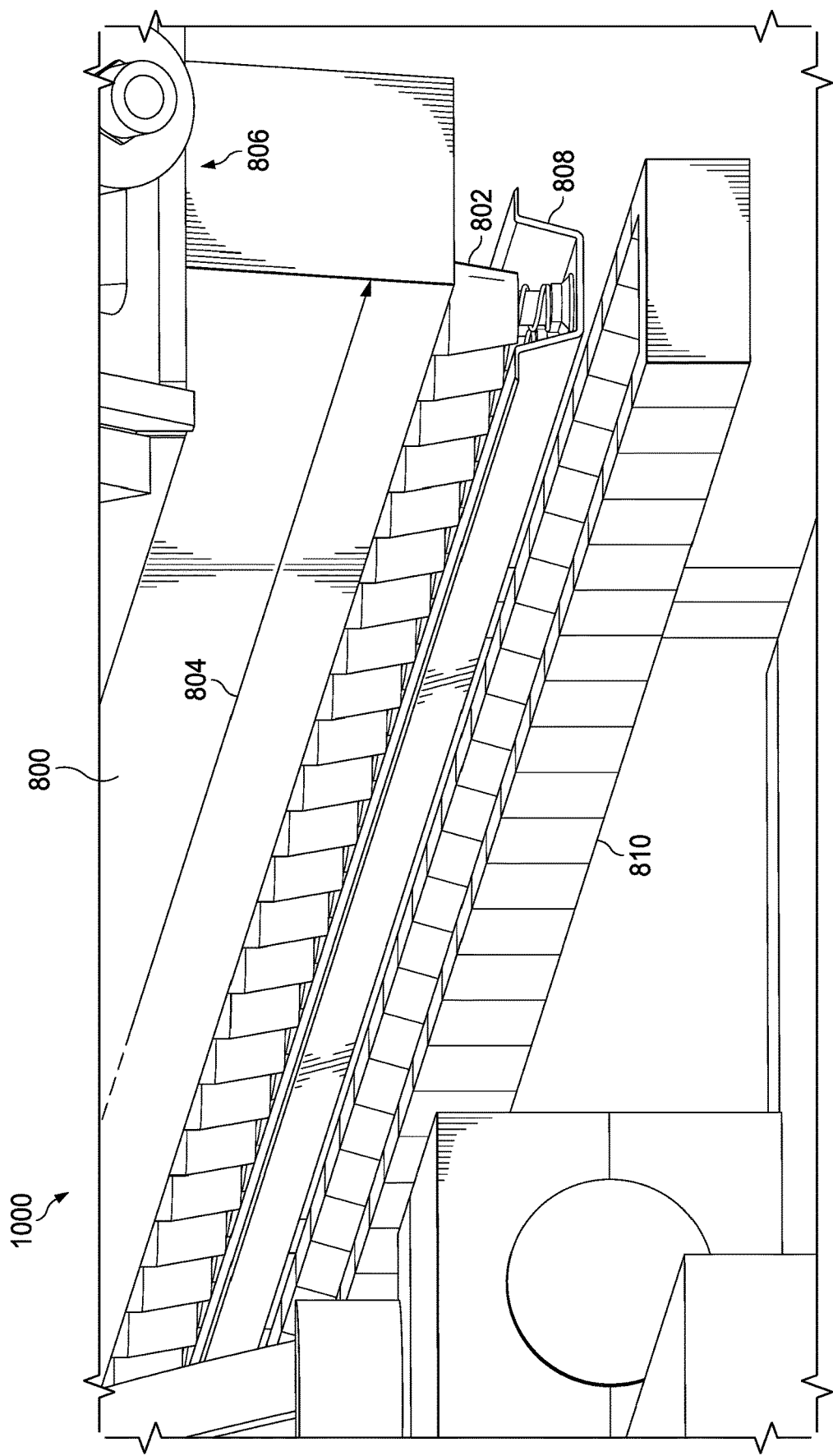
FIG. 10 is an illustration of an isometric view of a longitudinal end effector lifting a composite charge from a stiffener tray in accordance with an illustrative embodiment.

Turning now to FIG. 10, an illustration of an isometric view of a longitudinal end effector lifting a composite charge from a stiffener tray is depicted in accordance with an illustrative embodiment. In view 1000, plurality of vacuum cups 802 is in contact with stiffener composite charge 808. As depicted, plurality of vacuum cups 802 is normal to top of stiffener composite charge 808.

In view 1000, longitudinal end effector 800 is shown lifting stiffener composite charge 808 from stiffener tray 810 by applying a flow through a vacuum system of longitudinal end effector 800. The vacuum system comprises plurality of vacuum cups 802. The flow through the vacuum system holds stiffener composite charge 808 against plurality of vacuum cups 802. Applying a vacuum through longitudinal end effector 800 holds stiffener composite charge 808 against plurality of vacuum cups 802 until the flow is stopped.

Figure 11:
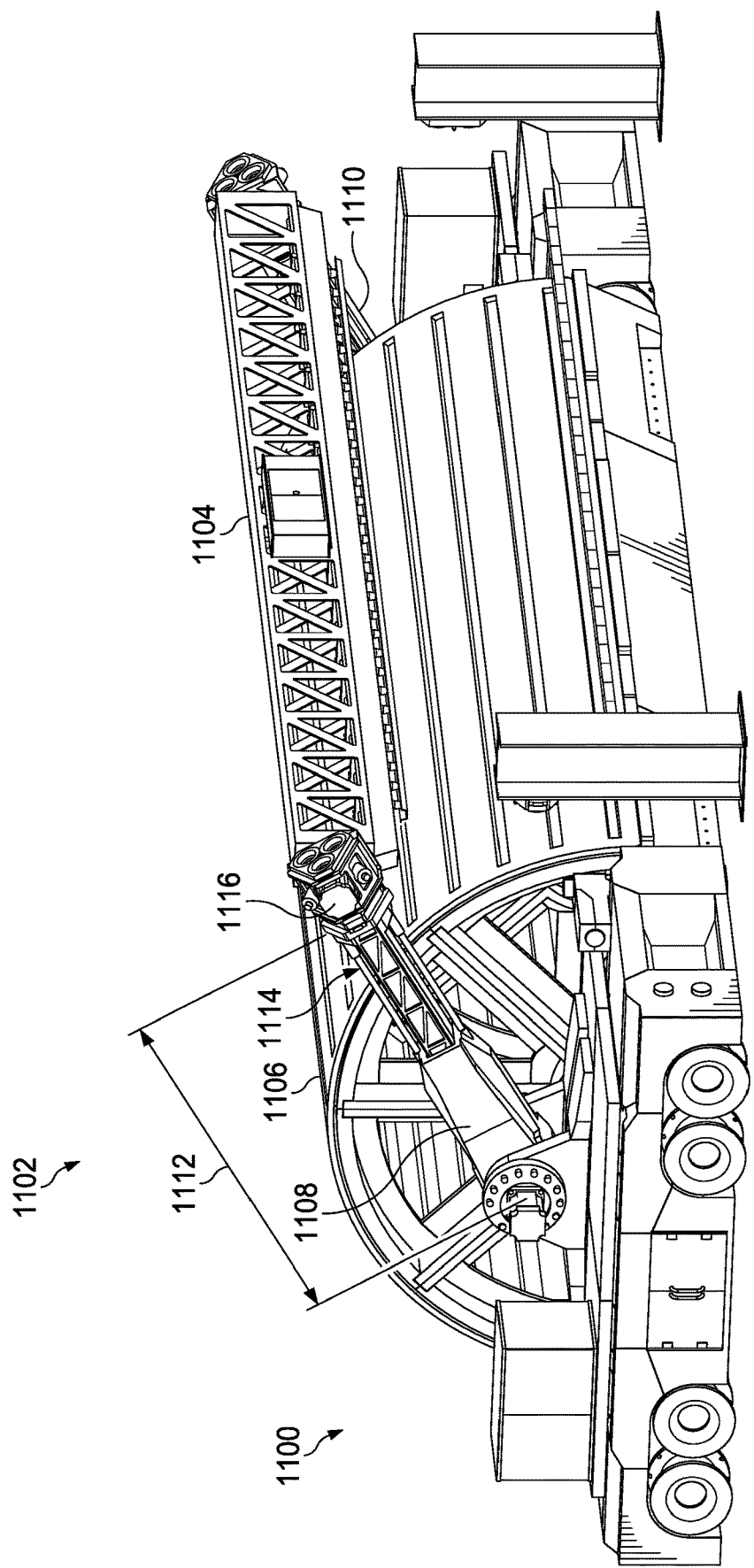
FIG. 11 is an illustration of an isometric view of rotational arms moving a longitudinal end effector holding a composite charge relative to a mandrel in accordance with an illustrative embodiment.
Figure 12:
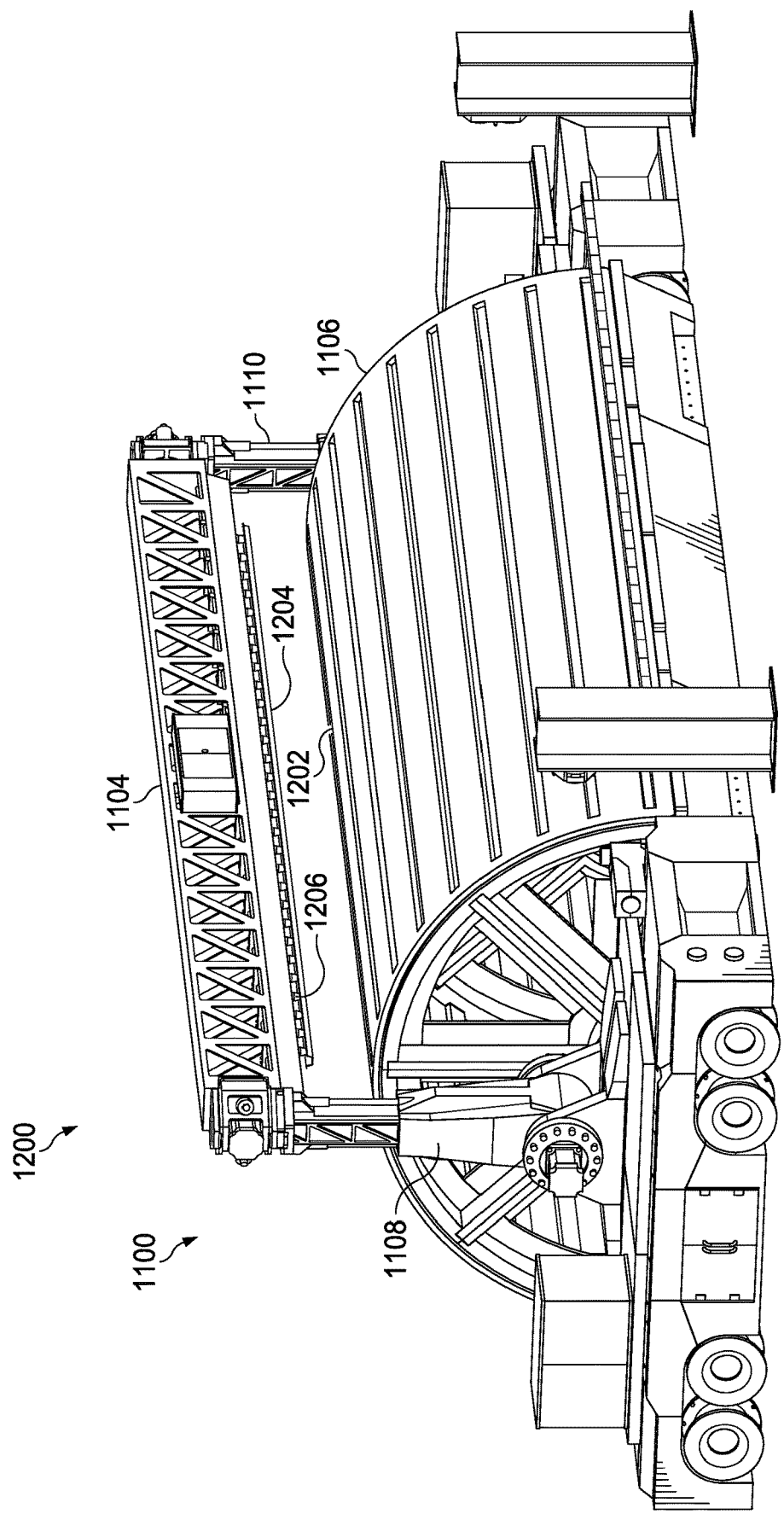
FIG. 12 is an illustration of an isometric view of a longitudinal end effector holding a composite charge positioned relative to a desired cavity in a mandrel in accordance with an illustrative embodiment.
Figure 13:
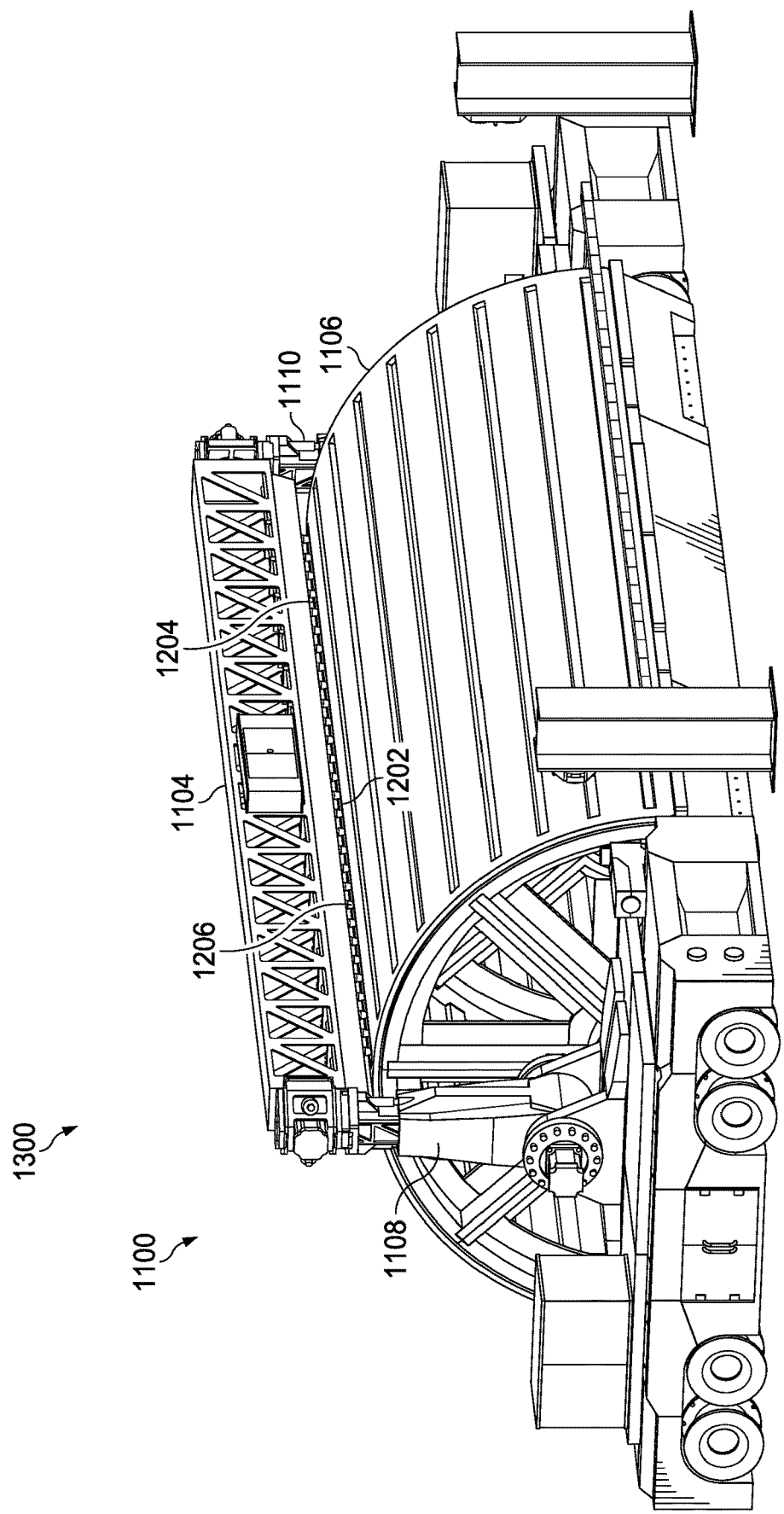
FIG. 13 is an illustration of an isometric view of rotational arms moving a longitudinal end effector holding a composite charge towards a desired cavity in a mandrel in accordance with an illustrative embodiment.

FIGS. 11-13 depict movements of a stiffener composite charge placement system after longitudinal end effector lifts a stiffener composite charge. In some illustrative examples, FIGS. 11-13 depict movements of a stiffener composite charge placement system with longitudinal end effector 800 after view 1000.

Turning now to FIG. 11, an illustration of an isometric view of rotational arms moving a longitudinal end effector holding a composite charge relative to a mandrel is depicted in accordance with an illustrative embodiment. Stiffener composite charge placement system 1100 is a physical implementation of stiffener composite charge placement system 102 of FIG. 1. Stiffener composite charge placement system 1100 may be the same as stiffener composite charge placement system 206 of FIGS. 2-7. In some illustrative examples, longitudinal end effector 800 of FIGS. 8-10 is a component of stiffener composite charge placement system 1100.

In view 1102, stiffener composite charge placement system 1100 is moving longitudinal end effector 1104 holding a stiffener composite charge relative to mandrel 1106 by rotating first rotational arm 1108 and second rotational arm 1110 while first rotational arm 1108 and second rotational arm 1110 are connected to longitudinal end effector 1104. As depicted, length 1112 of first rotational arm 1108 in extended position 1114 provides for rotation of longitudinal end effector 1104 about the entirety of mandrel 1106.

Longitudinal end effector 1104 also has number of movement systems 1116 configured to change an orientation of a plurality of vacuum cups of longitudinal end effector 1104 relative to manufacturing floor 1118. In some illustrative examples, as longitudinal end effector 1104 is moved relative to mandrel 1106, number of movement systems 1116 rotates portions of longitudinal end effector 1104 relative to first rotational arm 1108 and second rotational arm 1110. In some illustrative examples, number of movement systems 1116 rotates portions of longitudinal end effector 1104 to position the stiffener composite charge relative to a desired cavity. In some illustrative examples, number of movement systems 1116 rotates portions of longitudinal end effector 1104 to position the plurality of vacuum cups perpendicular to a desired cavity.

Turning now to FIG. 12, an illustration of an isometric view of a longitudinal end effector holding a composite charge positioned relative to a desired cavity in a mandrel is depicted in accordance with an illustrative embodiment. In view 1200, longitudinal end effector 1104 is positioned relative to mandrel 1106. In view 1200, longitudinal end effector 1104 is positioned relative to cavity 1202 of mandrel 1106.

In view 1200, stiffener composite charge 1204 is held by plurality of vacuum cups 1206 of longitudinal end effector 1104. Longitudinal end effector 1104 is positioned such that stiffener composite charge 1204 is held normal to cavity 1202.

Turning now to FIG. 13, an illustration of an isometric view of rotational arms moving a longitudinal end effector holding a composite charge towards a desired cavity in a mandrel is depicted in accordance with an illustrative embodiment. Between view 1200 and view 1300, stiffener composite charge placement system 1100 has placed stiffener composite charge 1204 into cavity 1202 of mandrel 1106 by retracting first rotational arm 1108 and second rotational arm 1110. In view 1300, stiffener composite charge 1204 is within cavity 1202 of mandrel 1106.

Stiffener composite charge 1204 is compacted in cavity 1202 by moving components of longitudinal end effector 1104 normal to cavity 1202 while first rotational arm 1108 and second rotational arm 1110 are stationary. After compacting stiffener composite charge 1204 in cavity 1202, longitudinal end effector 1104 is moved away from mandrel 1106. To move longitudinal end effector 1104 away from mandrel 1106, first rotational arm 1108 and second rotational arm 1110 are extended. Prior to moving longitudinal end effector 1104 away from mandrel 1106, vacuum is released from plurality of vacuum cups 1206. By releasing vacuum from plurality of vacuum cups 1206, longitudinal end effector 1104 releases stiffener composite charge 1204.

Figure 14A:
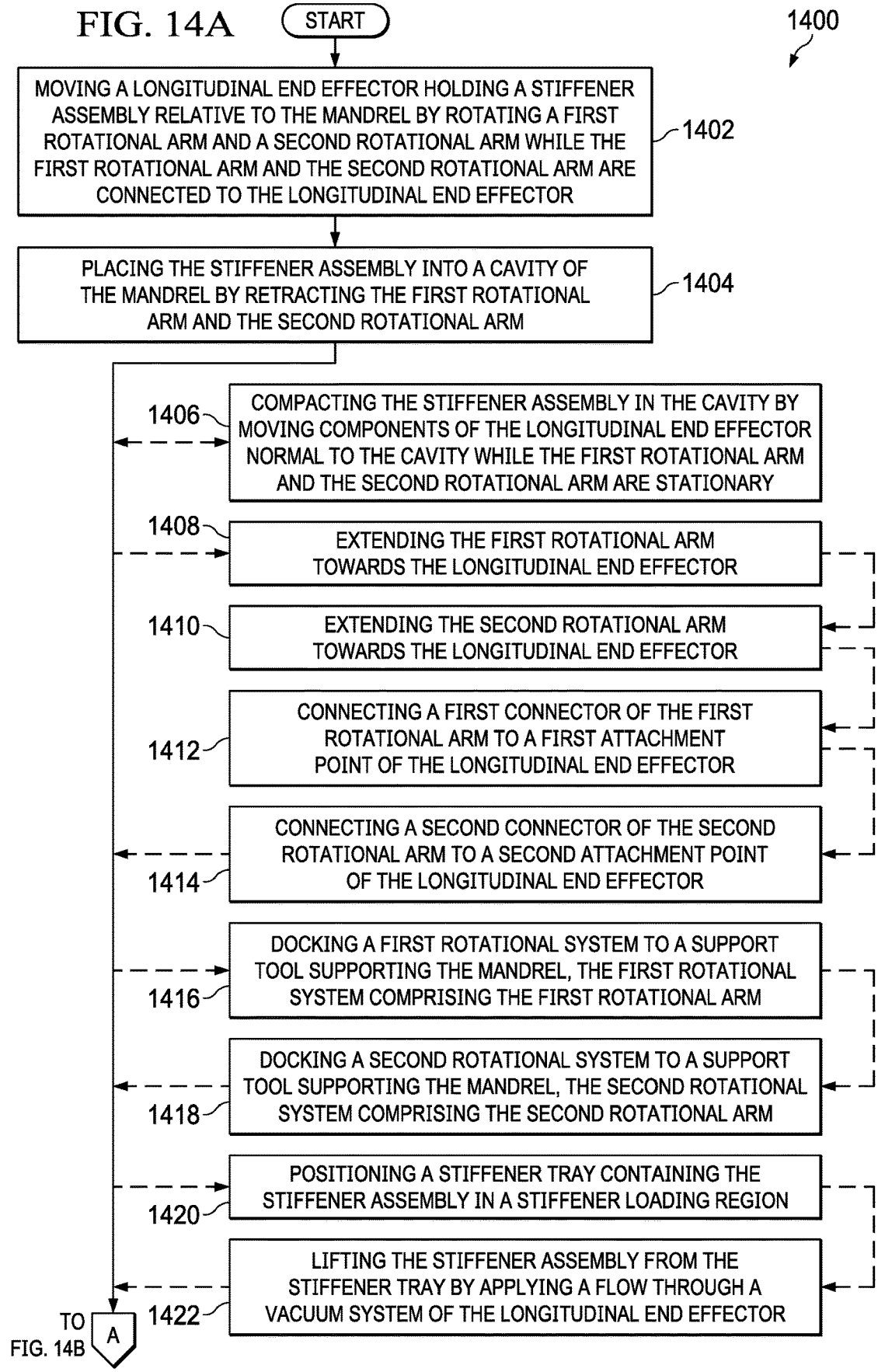
FIGS. 14A and 14B are illustrations of a flowchart of a method of applying a composite charge of stiffener to a mandrel in accordance with an illustrative embodiment.
Figure 14B:
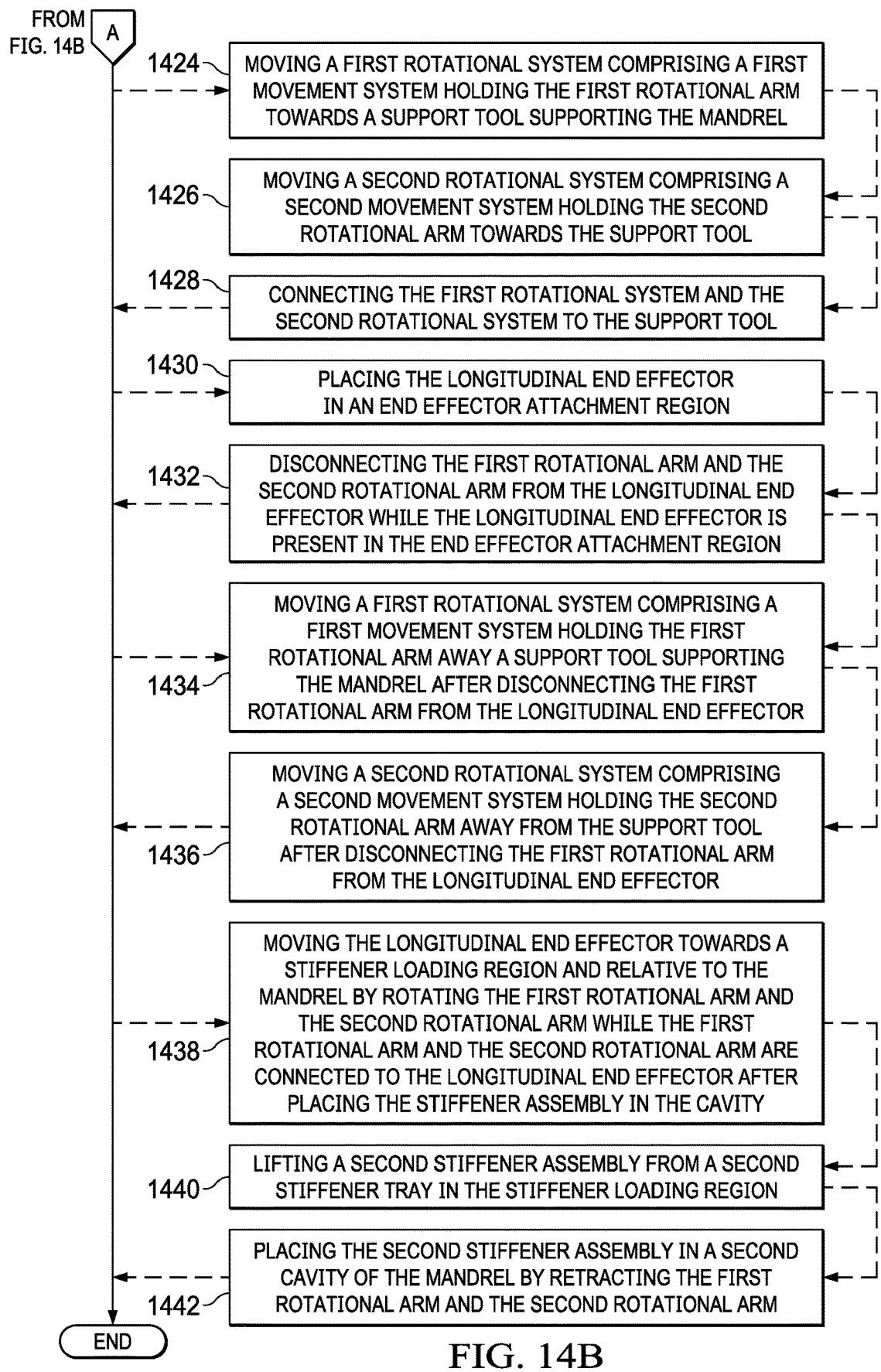

Turning now to FIGS. 14A and 14B, an illustration of a flowchart of a method of applying a composite charge of stiffener to a mandrel is depicted in accordance with an illustrative embodiment. Method 1400 may be implemented using stiffener composite charge placement system 102 in manufacturing environment 100 of FIG. 1. Method 1400 may be implemented using stiffener composite charge placement system 206 in manufacturing environment 200 of FIG. 2. Method 1400 may be implemented using stiffener composite charge placement system 302 of FIGS. 3-7. Method 1400 may be implemented using longitudinal end effector 800 of FIGS. 8-10. Method 1400 may be implemented using stiffener composite charge placement system 1100 of FIGS. 11-13.

Method 1400 moves a longitudinal end effector holding the stiffener composite charge relative to the mandrel by rotating a first rotational arm and a second rotational arm while the first rotational arm and the second rotational arm are connected to the longitudinal end effector (operation 1402). Method 1400 places the stiffener composite charge into the cavity of the mandrel by retracting the first rotational arm and the second rotational arm (operation 1404). Retracting the first rotational arm and the second rotational arm brings the longitudinal end effector towards the mandrel. Afterwards, method 1400 terminates.

In some illustrative examples, method 1400 compacts the stiffener composite charge in the cavity by moving components of the longitudinal end effector normal to the cavity while the first rotational arm and the second rotational arm are stationary (operation 1406). By moving the components of the longitudinal end effector normal to the cavity, pressure is applied to the stiffener composite charge by the longitudinal end effector.

Longitudinal end effector is removeable from the first rotational arm and the second rotational arm. In some illustrative examples, longitudinal end effector is held in an end effector attachment region while the first rotational arm and the second rotational arm are connected to the longitudinal end effector. In some illustrative examples, method 1400 extends the first rotational arm towards the longitudinal end effector (operation 1408), extends the second rotational arm towards the longitudinal end effector (operation 1410), connects a first connector of the first rotational arm to a first attachment point of the longitudinal end effector (operation 1412), and connects a second connector of the second rotational arm to a second attachment point of the longitudinal end effector (operation 1414).

In some illustrative examples, the first rotational arm and the second rotational arm are relocated within a manufacturing environment. The first rotational arm and the second rotational arm may be parked away from mandrel movement rails prior to the mandrel being positioned.

In some illustrative examples, method 1400 docks a first rotational system to a support tool supporting the mandrel, the first rotational system comprising the first rotational arm (operation 1416). In these illustrative examples, method 1400 docks a second rotational system to a support tool supporting the mandrel, the second rotational system comprising the second rotational arm (operation 1418). By docking the first rotational system and the second rotational system to the support tool, indexing steps may be reduced. By docking the first rotational system and the second rotational system to the support tool, the locations of the first rotational system and the second rotational system relative to the mandrel are known.

In some illustrative examples, method 1400 positions a stiffener tray containing the stiffener composite charge in a stiffener loading region (operation 1420). The stiffener loading region is positioned such that the longitudinal end effector can reach the stiffener composite charge. In some illustrative examples, method 1400 lifts the stiffener composite charge from the stiffener tray by applying a flow through a vacuum system of the longitudinal end effector (operation 1422). The flow through the vacuum system holds stiffener composite charge against components of the longitudinal end effector. In some illustrative examples, the flow through the vacuum system holds stiffener composite charge against a plurality of vacuum cups. Applying a vacuum through the longitudinal end effector holds the stiffener composite charge against the plurality of vacuum cups until the flow is stopped.

In some illustrative examples, method 1400 moves a first rotational system comprising a first movement system holding the first rotational arm towards a support tool supporting the mandrel (operation 1424), moves a second rotational system comprising a second movement system holding the second rotational arm towards the support tool (operation 1426), and connects the first rotational system and the second rotational system to the support tool (operation 1428). In these illustrative examples, the first rotational system and the second rotational system are physically indexed to the support tool.

In some illustrative examples, method 1400 places the longitudinal end effector in an end effector attachment region (operation 1430), and disconnects the first rotational arm and the second rotational arm from the longitudinal end effector while the longitudinal end effector is present in the end effector attachment region (operation 1432). In some illustrative examples, operation 1430 and operation 1432 are performed after each stiffener composite charge is placed into a respective cavity of the mandrel.

In some illustrative examples, method 1400 moves a first rotational system comprising a first movement system holding the first rotational arm away a support tool supporting the mandrel after disconnecting the first rotational arm from the longitudinal end effector (operation 1434), and moves a second rotational system comprising a second movement system holding the second rotational arm away from the support tool after disconnecting the first rotational arm from the longitudinal end effector (operation 1436). After moving the first rotational system and the second rotational system away from the support tool, the support tool and mandrel may be moved within the manufacturing environment.

In some illustrative examples, method 1400 moves the longitudinal end effector towards a stiffener loading region and relative to the mandrel by rotating the first rotational arm and the second rotational arm while the first rotational arm and the second rotational arm are connected to the longitudinal end effector after placing the stiffener composite charge in the cavity (operation 1438). The longitudinal end effector may be used to repeatedly pick and place stiffener composite charges by rotating the first rotational arm and the second rotational arm. The longitudinal end effector may pick and place a subsequent stiffener composite charge after operation 1438.

In some illustrative examples, method 1400 lifts a second stiffener composite charge from a second stiffener tray in the stiffener loading region (operation 1440), and places the second stiffener composite charge in a second cavity of the mandrel by retracting the first rotational arm and the second rotational arm (operation 1442).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 1404 through 1442 of FIGS. 14A and 14B may be optional.

Figure 15:
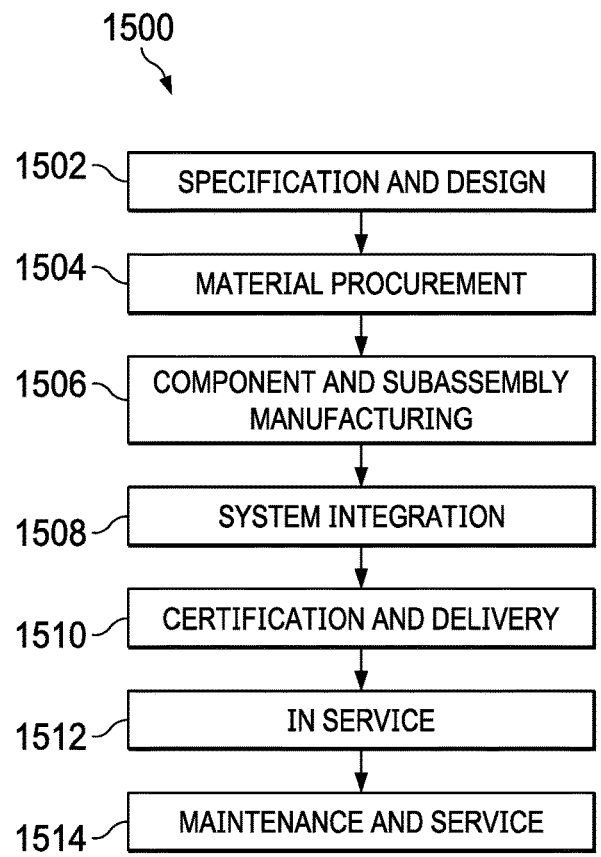
FIG. 15 is an illustration of an aircraft manufacturing and service method in a form of a block diagram in accordance with an illustrative embodiment.
Figure 16:
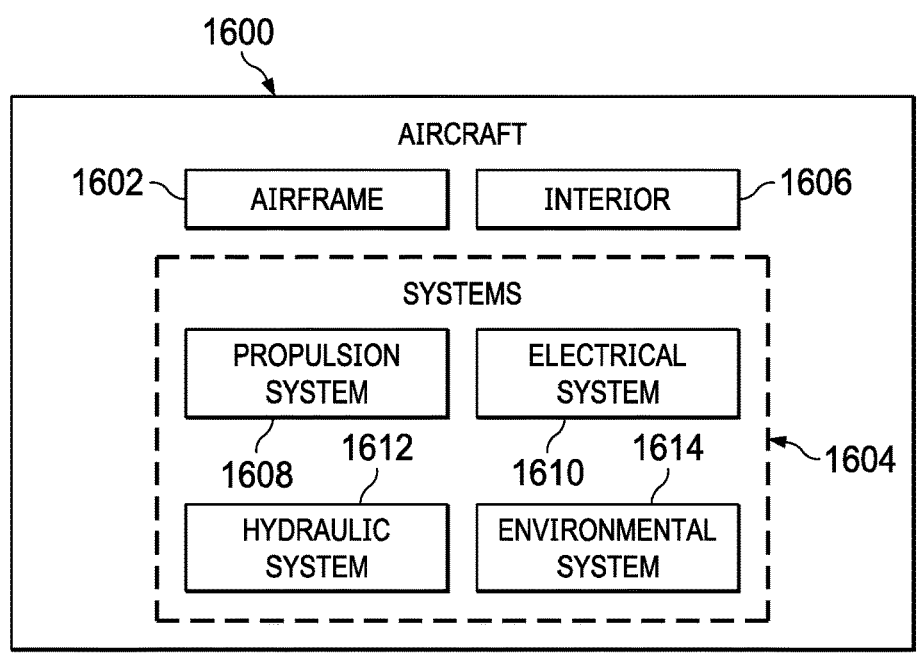
FIG. 16 is an illustration of an aircraft in a form of a block diagram in which an illustrative embodiment may be implemented.

Illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, or other maintenance and service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 of FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during at least one of component and subassembly manufacturing 1506, system integration 1508, or maintenance and service 1514 of FIG. 15. For example, stiffener composite charge placement system 102 of FIG. 1 may be used during component and subassembly manufacturing 1506 to form airframe 1602. As an example, method 1400 may be used during component and subassembly manufacturing 1506 to form airframe 1602. As another illustrative example, stiffener composite charge placement system 102 may be used to manufacture a component for use in maintenance and service 1514. In some illustrative examples, method 1400 may be used to manufacture portions of aircraft 1600 such as portions of interior 1606.

The illustrative examples provide a stiffener composite charge placement system configured to lift and place stiffener composite charges within cavities of a mandrel. The illustrative examples provide a stiffener composite charge placement system capable of placing longitudinal composite charges at any location of the outer surface of a half barrel mandrel.

The stiffener composite charge placement system has two large rotating arms supporting a long beam-like end effector. The two rotational arms are designed to be capable of reaching all points on the surface of the fuselage half-mandrel. The rotating arms and end effector are capable of installing all of the stringers on the half-mandrel. The stiffener composite charge placement system is capable of placing stiffener composite charges onto a fuselage half-mandrel, a shape of mandrel that previously used two conventional gantry and/or crane systems to place composite charges. The illustrative examples reduce the quantity of placement systems. Components of the stiffener composite charge placement system can be mounted to rail/tracks on the ground and/or to mobile AGV-units.

During operation, a fuselage half-mandrel is transported to the stiffener composite charge placement system. The two rotational systems including the two rotational arms are moved into place. The beam-like end-effector, longitudinal end effector, grips a precured stiffener composite charge. The two rotational arms rotate into place relative to a desired cavity. The rotational arms compact the stiffener composite charge down into the desired cavity of the mandrel.

The stiffener composite charge placement system is capable of reaching all cavities on the outer surface of a half barrel mandrel, without a gantry or permanent platforms.

The stiffener composite charges can be delivered to a single side of the stiffener composite charge placement system to minimize the size of the work envelope and to localize personnel and equipment.

The illustrative embodiments reduce usage of a gantry within the manufacturing environment. In some illustrative examples, pillars and rails for a gantry system are reduced. Reducing gantry pillars and rails in a manufacturing environment may increase movement paths within the manufacturing environment. Reducing gantry pillars and rails in a manufacturing environment may increase factory flow by reducing gantry pillars and rails in the manufacturing environment.

The illustrative examples reduce the up-front cost of tooling for stiffener installation processes. The illustrative examples reduce the quantity of foundations and supports with a manufacturing environment. The illustrative examples reduce indexing time for the mandrel. The illustrative examples may reduce part movement to completion. The illustrative examples reduce manual installation of stiffeners. In some illustrative examples, the layout of the stiffener composite charge placement system allows for faster response in event where a mandrel is to be reworked or pulled from the line.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A stiffener composite charge placement system comprising:
   a longitudinal end effector having a first attachment point and a second attachment point;
   a first rotational arm having a first connector configured to connect to the first attachment point;
   a first movement system configured to move the first rotational arm within a manufacturing environment;
   a second rotational arm having a second connector configured to connect to the second attachment point; and
   a second movement system configured to move the second rotational arm within the manufacturing environment,
   wherein the first movement system has a first set of mechanical indices configured to interface with a first set of docking points of a support tool configured to support a mandrel, and
   wherein the second movement system has a second set of mechanical indices configured to interface with a second set of docking points of the support tool.

2. The stiffener composite charge placement system of claim 1, wherein a rotation point of the first rotational arm is mounted on the first movement system, and wherein a rotation point of the second rotational arm is mounted on the second movement system.

3. The stiffener composite charge placement system of claim 2, wherein the first rotational arm is extendable relative to the rotation point of the first rotational arm; and wherein the second rotational arm is extendable relative to the rotation point of the second rotational arm.

4. The stiffener composite charge placement system of claim 1, wherein the longitudinal end effector comprises a plurality of vacuum cups distributed along a length of the longitudinal end effector.

5. The stiffener composite charge placement system of claim 4, wherein the longitudinal end effector further comprises a plurality of movement systems configured to change an orientation of the plurality of vacuum cups relative to a manufacturing floor.

6. The stiffener composite charge placement system of claim 1, wherein the longitudinal end effector further comprises a location system having a plurality of sensors configured to position the longitudinal end effector relative to a stiffener composite charge.

7. The stiffener composite charge placement system of claim 6, wherein the plurality of sensors comprise at least one of an optical sensor or a laser sensor.

8. The stiffener composite charge placement system of claim 1, wherein the longitudinal end effector further comprises a plurality of movement systems configured to move the longitudinal end effector independently of the first rotational arm and the second rotational arm.

9. A stiffener composite charge placement system comprising:
   a first rotational system comprising a first rotational arm mounted on a first movement system configured to relocate the first rotational arm within a manufacturing environment;
   a second rotational system comprising a second rotational arm mounted on a second movement system configured to relocate the second rotational arm within the manufacturing environment; and
   a longitudinal end effector configured to be connected to the first rotational arm and the second rotational arm,
   wherein the first movement system has a first set of mechanical indices configured to interface with a first set of docking points of a support tool configured to support a mandrel, and
   wherein the second movement system has a second set of mechanical indices configured to interface with a second set of docking points of the support tool.

10. The stiffener composite charge placement system of claim 9, wherein a rotation point of the first rotational arm is mounted on the first movement system, and wherein a rotation point of the second rotational arm is mounted on the second movement system.

11. The stiffener composite charge placement system of claim 10, wherein the first rotational arm is extendable relative to the rotation point of the first rotational arm; and wherein the second rotational arm is extendable relative to the rotation point of the second rotational arm.

12. The stiffener composite charge placement system of claim 9, wherein the longitudinal end effector further comprises a plurality of movement systems configured to move the longitudinal end effector independently of the first rotational arm and the second rotational arm.

13. The stiffener composite charge placement system of claim 9, wherein the longitudinal end effector comprises a plurality of vacuum cups distributed along a length of the longitudinal end effector.

14. The stiffener composite charge placement system of claim 13, wherein the longitudinal end effector further comprises a plurality of movement systems configured to change an orientation of the plurality of vacuum cups relative to a manufacturing floor.

15. The stiffener composite charge placement system of claim 9, wherein the longitudinal end effector further comprises a location system having a plurality of sensors configured to position the longitudinal end effector relative to a stiffener composite charge.

16. The stiffener composite charge placement system of claim 15, wherein the plurality of sensors comprise at least one of an optical sensor or a laser sensor.

17. An apparatus, comprising:
a longitudinal end effector having a first attachment point and a second attachment point;
a first rotational system comprising a first rotational arm having a first connector configured to connect to the first attachment point, the first rotation system mounted on a first movement system configured to relocate the first rotational arm within a manufacturing environment; and
a second rotational system comprising a second rotational arm having a second connector configured to connect to the second attachment point, the second rotational system mounted on a second movement system configured to relocate the second rotational arm within the manufacturing environment,
wherein the first movement system has a first set of mechanical indices configured to interface with a first set of docking points of a support tool configured to support a mandrel, and
wherein the second movement system has a second set of mechanical indices configured to interface with a second set of docking points of the support tool.

18. The apparatus of claim 17, wherein a rotation point of the first rotational arm is mounted on the first movement system, and wherein a rotation point of the second rotational arm is mounted on the second movement system.

19. The apparatus of claim 18, wherein the first rotational arm is extendable relative to the rotation point of the first rotational arm; and wherein the second rotational arm is extendable relative to the rotation point of the second rotational arm.

20. The apparatus of claim 17, wherein the longitudinal end effector comprises a plurality of vacuum cups distributed along a length of the longitudinal end effector.

21. The apparatus of claim 20, wherein the longitudinal end effector further comprises a plurality of movement systems configured to change an orientation of the plurality of vacuum cups relative to a manufacturing floor.

22. The apparatus of claim 17, wherein the longitudinal end effector further comprises a location system having a plurality of sensors configured to position the longitudinal end effector relative to a stiffener composite charge.

23. The apparatus of claim 22, wherein the plurality of sensors comprise at least one of an optical sensor or a laser sensor.

24. The apparatus of claim 17, wherein the longitudinal end effector further comprises a plurality of movement systems configured to move the longitudinal end effector independently of the first rotational arm and the second rotational arm.

* * * * *